(12) United States Patent
Zeng et al.

(10) Patent No.: US 12,327,156 B2
(45) Date of Patent: Jun. 10, 2025

(54) RADIO-FREQUENCY IDENTIFICATION (RFID) PRINTER ANTENNA

(71) Applicant: Hand Held Products, Inc., Charlotte, NC (US)

(72) Inventors: Jian Zeng, Charlotte, NC (US); Deng Ao Yang, Charlotte, NC (US); Quanjin Shi, Charlotte, NC (US); Longchao Zhao, Charlotte, NC (US); Chuanqing Zeng, Charlotte, NC (US)

(73) Assignee: Hand Held Products, Inc., Charlotte, NC (US)

( * ) Notice: Subject to any disclaimer, the term of this patent is extended or adjusted under 35 U.S.C. 154(b) by 0 days.

(21) Appl. No.: 18/460,097

(22) Filed: Sep. 1, 2023

(65) Prior Publication Data
US 2024/0095487 A1   Mar. 21, 2024

(30) Foreign Application Priority Data
Sep. 16, 2022   (CN) .......................... 202211126621.5

(51) Int. Cl.
*G06K 17/00*   (2006.01)
*G06K 19/077*   (2006.01)
*H01Q 1/22*   (2006.01)

(52) U.S. Cl.
CPC ................ *G06K 19/0779* (2013.01)

(58) Field of Classification Search
CPC ........... G06K 19/0779; G06K 17/0025; H01Q 1/2225
USPC ......................................................... 235/492
See application file for complete search history.

(56) References Cited

U.S. PATENT DOCUMENTS

| 4,021,810 | A | 5/1977 | Urpo et al. |
| 7,463,199 | B2 * | 12/2008 | Soler Castany ......... H01Q 9/40 343/741 |
| 2003/0080919 | A1 * | 5/2003 | Forster ..................... H01Q 1/38 343/895 |
| 2007/0057861 | A1 | 3/2007 | Forster et al. |

FOREIGN PATENT DOCUMENTS

| CN | 103022644 A | 4/2013 |
| CN | 102820536 B | 11/2015 |
| CN | 112864605 A | 5/2021 |
| EP | 1983604 A2 | 10/2008 |
| KR | 10-0793524 B1 | 1/2008 |

OTHER PUBLICATIONS

Extended European Search Report Mailed on Feb. 2, 2024 for EP Application No. 23191311, 6 page(s).
Communication about intention to grant a European patent Mailed on Mar. 6, 2025 for EP Application No. 23191311, 5 page(s).

* cited by examiner

*Primary Examiner* — Toan C Ly
(74) *Attorney, Agent, or Firm* — Alston & Bird LLP

(57) ABSTRACT

Examples of radio-frequency identification (RFID) printer antennae are provided. For example, an example RFID printer antenna includes a plurality of axial RFID printer antenna segments and a plurality of oblique RFID printer antenna segments. In some examples, the plurality of axial RFID printer antenna segments are in parallel arrangements with one another. In some examples, each of the plurality of oblique RFID printer antenna segments connects two of the plurality of axial RFID printer antenna segments at oblique angles.

20 Claims, 14 Drawing Sheets

| | A | B | C | D | E | F | G | H | I | J | K | L | M | N | O | P | Q | R | S | T | U | V | W | X |
|---|---|---|---|---|---|---|---|---|---|---|---|---|---|---|---|---|---|---|---|---|---|---|---|---|
| P | 00 | 01 | 02 | 04 | 04 | 05 | 06 | 07 | 08 | 09 | 10 | 11 | 12 | 13 | 14 | 15 | 16 | 17 | 18 | 19 | 20 | 21 | 22 | |
| T | 01 | 01 | 01 | 01 | 02 | 02 | 02 | 02 | 02 | 02 | 02 | 02 | 02 | 02 | 02 | 02 | 02 | 02 | 02 | 02 | 00 | 00 | 00 | |
| -5 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 |
| -4 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 |
| -3 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 |
| -2 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 |
| -1 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 |
| 0 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 |
| 1 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 |
| 2 | 00 | 00 | 00 | 00 | 00 | 00 | 00 | 00 | 02 | 00 | 00 | 00 | 00 | 00 | 00 | 00 | 00 | 00 | 00 | 00 | 00 | 00 | 00 | 00 |
| 3 | 00 | 00 | 00 | 00 | 00 | 00 | 02 | 02 | 02 | 02 | 00 | 00 | 00 | 00 | 00 | 00 | 00 | 00 | 00 | 00 | 00 | 00 | 00 | 00 |
| 4 | 00 | 00 | 00 | 00 | 00 | 02 | 02 | 02 | 02 | 02 | 00 | 00 | 00 | 00 | 00 | 00 | 00 | 00 | 00 | 00 | 00 | 00 | 00 | 00 |
| 5 | 00 | 00 | 00 | 00 | 00 | 02 | 02 | 02 | 02 | 02 | 00 | 00 | 02 | 00 | 00 | 00 | 00 | 00 | 00 | 00 | 00 | 00 | 00 | 00 |
| 6 | 01 | 00 | 00 | 00 | 02 | 02 | 02 | 02 | 02 | 02 | 02 | 02 | 00 | 00 | 00 | 00 | 00 | 02 | 00 | 00 | 00 | 00 | 00 | 00 |
| 7 | -2 | 00 | 00 | 00 | 02 | 02 | 02 | 02 | 02 | 02 | 02 | 02 | 00 | 00 | 00 | 00 | 00 | 02 | 02 | 00 | 00 | 00 | 00 | 00 |
| 8 | 00 | 00 | 01 | 00 | 02 | 02 | 02 | 02 | 02 | 02 | 02 | 02 | 02 | 00 | 00 | 00 | 00 | 02 | 02 | 00 | 00 | 00 | 00 | 00 |
| 9 | 00 | 01 | 01 | 01 | 02 | 02 | 02 | 02 | 02 | 02 | 02 | 02 | 02 | 00 | 00 | 02 | 00 | 02 | 02 | 00 | 00 | 00 | 00 | 00 |
| 10 | 00 | 01 | 01 | 01 | -2 | 02 | 02 | 02 | 02 | 02 | 02 | 02 | 02 | 00 | 00 | 02 | 00 | 02 | 02 | 00 | 00 | 00 | 00 | 00 |
| 11 | 00 | 01 | 01 | 01 | 00 | 02 | 02 | 02 | 02 | 02 | 02 | 02 | 02 | 02 | 02 | 02 | 02 | 02 | 02 | 00 | 00 | 00 | 00 | 00 |
| 12 | 00 | -2 | 01 | -2 | 00 | -2 | 02 | 02 | 02 | 02 | 02 | 02 | 02 | 02 | 02 | 02 | 02 | 02 | 02 | 00 | 00 | 00 | 00 | 00 |
| 13 | 00 | 00 | 01 | 00 | 00 | 00 | -2 | 02 | 02 | 02 | 02 | 02 | 02 | 02 | 02 | 02 | 02 | 02 | 02 | 00 | 00 | 00 | 00 | 00 |
| 14 | 00 | 00 | 01 | 00 | 00 | 00 | 00 | 02 | 02 | 02 | 02 | 02 | 02 | 02 | 02 | 02 | 02 | 02 | 02 | 00 | 00 | 00 | 00 | 00 |
| 15 | 00 | 00 | 01 | 00 | 00 | 00 | 00 | -2 | 02 | 02 | 02 | 02 | 02 | 02 | 02 | 02 | 02 | 02 | 02 | 00 | 00 | 00 | 00 | 00 |
| 16 | 00 | 00 | 01 | 00 | 00 | 00 | 00 | 00 | -2 | 02 | 02 | 02 | 02 | 02 | 02 | 02 | 02 | 02 | 02 | 00 | 00 | 00 | 00 | 00 |
| 17 | 00 | 00 | 01 | 00 | 00 | 00 | 00 | 00 | 00 | 02 | 02 | 02 | 02 | 02 | 02 | 02 | 02 | 02 | 02 | 00 | 00 | 00 | 00 | 00 |
| 18 | 00 | 00 | 01 | 00 | 00 | 00 | 00 | 00 | 00 | 02 | 02 | 02 | 02 | 02 | 02 | 02 | 02 | 02 | 02 | 00 | 00 | 00 | 00 | 00 |
| 19 | 00 | 00 | 01 | 00 | 00 | 00 | 00 | 00 | 00 | 02 | 02 | 02 | 02 | 02 | 02 | 02 | 02 | 02 | 02 | 00 | 00 | 00 | 00 | 00 |
| 20 | 00 | 00 | 01 | 00 | 00 | 00 | 00 | 00 | 00 | -2 | 02 | 02 | 02 | 02 | 02 | 02 | 02 | 02 | 02 | 00 | 00 | 00 | 00 | 00 |
| 21 | 00 | 00 | -2 | 00 | 00 | 00 | 00 | 00 | 00 | 00 | 02 | 02 | 02 | 02 | 02 | 02 | 02 | 02 | 02 | 00 | 00 | 00 | 00 | 00 |
| 22 | 00 | 00 | 00 | 00 | 00 | 00 | 00 | 00 | 00 | 00 | 02 | 02 | 02 | 02 | 02 | 02 | 02 | 02 | 02 | 00 | 00 | 00 | 00 | 00 |
| 23 | 00 | 00 | 00 | 00 | 00 | 00 | 00 | 00 | 00 | 00 | -2 | 02 | 02 | 02 | 02 | 02 | 02 | 02 | 02 | 00 | 00 | 00 | 00 | 00 |
| 24 | 00 | 00 | 00 | 00 | 00 | 00 | 00 | 00 | 00 | 00 | 02 | 02 | 02 | 02 | 02 | 02 | 02 | 02 | 02 | 00 | 00 | 00 | 00 | 00 |
| 25 | 00 | 00 | 00 | 00 | 00 | 00 | 00 | 00 | 00 | 00 | -2 | 02 | 02 | 02 | 02 | 02 | 02 | 02 | -2 | 00 | 00 | 00 | 00 | 00 |
| 26 | 00 | 00 | 00 | 00 | 00 | 00 | 00 | 00 | 00 | 00 | 02 | -2 | 02 | 02 | 02 | 02 | 02 | 00 | 00 | 00 | 00 | 00 | 00 | 00 |
| 27 | 00 | 00 | 00 | 00 | 00 | 00 | 00 | 00 | 00 | 00 | -2 | 00 | 02 | 02 | 02 | 02 | -2 | 00 | 00 | 00 | 00 | 00 | 00 | 00 |
| 28 | 00 | 00 | 00 | 00 | 00 | 00 | 00 | 00 | 00 | 00 | 00 | 02 | 02 | 02 | 02 | 00 | 00 | 00 | 00 | 00 | 00 | 00 | 00 | 00 |
| 29 | 00 | 00 | 00 | 00 | 00 | 00 | 00 | 00 | 00 | 00 | 00 | 00 | 02 | 02 | 02 | -2 | 00 | 00 | 00 | 00 | 00 | 00 | 00 | 00 |
| 30 | 00 | 00 | 00 | 00 | 00 | 00 | 00 | 00 | 00 | 00 | 00 | 00 | 00 | -2 | 02 | -2 | 00 | 00 | 00 | 00 | 00 | 00 | 00 | 00 |

FIG. 7

| A | B | C | D | E | F | G | H | I | J | K | L | M | N | O | P | Q | R | S | T | U | V |
|---|---|---|---|---|---|---|---|---|---|---|---|---|---|---|---|---|---|---|---|---|---|
| P | 00 | 01 | 02 | 03 | 04 | 05 | 06 | 07 | 08 | 09 | 10 | 11 | 12 | 13 | 14 | 15 | 16 | 17 | 18 | 19 | 20 |
| T | 01 | 01 | 01 | 01 | 01 | 02 | 03 | 03 | 03 | 03 | 03 | 03 | 03 | 03 | 03 | 03 | 03 | 03 | 03 | 03 | 00 |
| -5 | 00 | 00 | 00 | 00 | 00 | 00 | 00 | 00 | 00 | 00 | 00 | 00 | 00 | 00 | 00 | 00 | 00 | 00 | 00 | 00 | 00 |
| -4 | 00 | 00 | 00 | 00 | 00 | 00 | 00 | 00 | 00 | 00 | 00 | 00 | 00 | 00 | 00 | 00 | 00 | 00 | 00 | 00 | 00 |
| -3 | 00 | 00 | 00 | 00 | 00 | 00 | 00 | 00 | 00 | 00 | 00 | 00 | 00 | 00 | 00 | 00 | 00 | 00 | 00 | 00 | 00 |
| -2 | 00 | 00 | 00 | 00 | 00 | 00 | 00 | 00 | 00 | 00 | 00 | 00 | 00 | 00 | 00 | 00 | 00 | 00 | 00 | 00 | 00 |
| -1 | 00 | 00 | 00 | 00 | 00 | 02 | 02 | 00 | 03 | 00 | 00 | 00 | 00 | 00 | 00 | 00 | 00 | 00 | 00 | 00 | 00 |
| 0 | 00 | 00 | 00 | 00 | 00 | 00 | 00 | 00 | -2 | 00 | 00 | 00 | 00 | 00 | 00 | 00 | 00 | 00 | 00 | 00 | 00 |
| 1 | 00 | 00 | 00 | 00 | 00 | -1 | 03 | 03 | 00 | 00 | 00 | 00 | 00 | 00 | 00 | 00 | 00 | 00 | 00 | 00 | 00 |
| 2 | 00 | 00 | 00 | 00 | 00 | -4 | 03 | 03 | 00 | 00 | 00 | 00 | 00 | 00 | 00 | 00 | 00 | 00 | 00 | 00 | 00 |
| 3 | 00 | 00 | 00 | 00 | 00 | -4 | -2 | 03 | 00 | 00 | 00 | 00 | 00 | 00 | 00 | 00 | 00 | 00 | 00 | 00 | 00 |
| 4 | 00 | 01 | 01 | 01 | 01 | -2 | 00 | 03 | 00 | 00 | 00 | 00 | 00 | 00 | 00 | 00 | 00 | 00 | 00 | 00 | 00 |
| 5 | 01 | -2 | 01 | 01 | -2 | 00 | 00 | 03 | 00 | 00 | 00 | 03 | 00 | 00 | 00 | 00 | 00 | 00 | 00 | 00 | 00 |
| 6 | 01 | 00 | 01 | -2 | 00 | 00 | 00 | -2 | 00 | 03 | 03 | 03 | 00 | 00 | 00 | 00 | 00 | 00 | 00 | 00 | 00 |
| 7 | 01 | 00 | 01 | 00 | 00 | 00 | 00 | 00 | 00 | 03 | 03 | 03 | 00 | 00 | 00 | 00 | 00 | 00 | 00 | 00 | 00 |
| 8 | 01 | 00 | -2 | 00 | 00 | 00 | 00 | 00 | 00 | 03 | 03 | 03 | 00 | 00 | 00 | 00 | 00 | 00 | 00 | 00 | 00 |
| 9 | 01 | 00 | 00 | 00 | 00 | 00 | 00 | 00 | 00 | 03 | 03 | 03 | 03 | 00 | 00 | 00 | 00 | 00 | 00 | 00 | 00 |
| 10 | 01 | 00 | 00 | 00 | 00 | 00 | 00 | 00 | 00 | 03 | 03 | 03 | 03 | 00 | 00 | 00 | 00 | 00 | 00 | 00 | 00 |
| 11 | 01 | 00 | 00 | 00 | 00 | 00 | 00 | 00 | 00 | 03 | 03 | 03 | 03 | 00 | 00 | 00 | 00 | 00 | 00 | 00 | 00 |
| 12 | 01 | 00 | 00 | 00 | 00 | 00 | 00 | 00 | 00 | 03 | 03 | 03 | 03 | 00 | 00 | 00 | 00 | 00 | 00 | 00 | 00 |
| 13 | 01 | 00 | 00 | 00 | 00 | 00 | 00 | 00 | 00 | 03 | 03 | 03 | 03 | 03 | 00 | 00 | 00 | 00 | 00 | 00 | 00 |
| 14 | -2 | 00 | 00 | 00 | 00 | 00 | 00 | 00 | 00 | 03 | 03 | 03 | 03 | 00 | 00 | 00 | 00 | 00 | 00 | 03 | 00 |
| 15 | 00 | 00 | 00 | 00 | 00 | 00 | 00 | 00 | 00 | 03 | 03 | 03 | 03 | 00 | 00 | 00 | 00 | 00 | 03 | 03 | 00 |
| 16 | 00 | 00 | 00 | 00 | 00 | 00 | 00 | 00 | -2 | 03 | 03 | 03 | 03 | 00 | 00 | 00 | 00 | 03 | 03 | 03 | 00 |
| 17 | 00 | 00 | 00 | 00 | 00 | 00 | 00 | 00 | 00 | 03 | 03 | 03 | 03 | 00 | 00 | 00 | 03 | 03 | 03 | 03 | 00 |
| 18 | 00 | 00 | 00 | 00 | 00 | 00 | 00 | 00 | 00 | 03 | 03 | 03 | 03 | 00 | 00 | 03 | 03 | 03 | 03 | 03 | 00 |
| 19 | 00 | 00 | 00 | 00 | 00 | 00 | 00 | 00 | 00 | 03 | 03 | 03 | 03 | 00 | 03 | 03 | 03 | 03 | 03 | 03 | 00 |
| 20 | 00 | 00 | 00 | 00 | 00 | 00 | 00 | 00 | 00 | 03 | 03 | 03 | 03 | 00 | 03 | 03 | 03 | 03 | 03 | 03 | 00 |
| 21 | 00 | 00 | 00 | 00 | 00 | 00 | 00 | 00 | 00 | 03 | 03 | 03 | 03 | 03 | 03 | 03 | 03 | 03 | 03 | 03 | 00 |
| 22 | 00 | 00 | 00 | 00 | 00 | 00 | 00 | 00 | 00 | 03 | 03 | 03 | 03 | 03 | 03 | 03 | 03 | 03 | 03 | 03 | 00 |
| 23 | 00 | 00 | 00 | 00 | 00 | 00 | 00 | 00 | 00 | 03 | 03 | 03 | 03 | 03 | 03 | 03 | 03 | 03 | 03 | 03 | 00 |
| 24 | 00 | 00 | 00 | 00 | 00 | 00 | 00 | 00 | 00 | -2 | 03 | 03 | 03 | 03 | 03 | 03 | 03 | 03 | 03 | 03 | 00 |
| 25 | 00 | 00 | 00 | 00 | 00 | 00 | 00 | 00 | 00 | 00 | 03 | 03 | 03 | 03 | 03 | 03 | 03 | 03 | 03 | 03 | 00 |
| 26 | 00 | 00 | 00 | 00 | 00 | 00 | 00 | 00 | 00 | 00 | 03 | 03 | 03 | 03 | 03 | 03 | 03 | 03 | 03 | 03 | 00 |
| 27 | 00 | 00 | 00 | 00 | 00 | 00 | 00 | 00 | 00 | 00 | -2 | 03 | 03 | 03 | 03 | 03 | 03 | 03 | 03 | 03 | 00 |
| 28 | 00 | 00 | 00 | 00 | 00 | 00 | 00 | 00 | 00 | 00 | 00 | 03 | 03 | 03 | 03 | 03 | 03 | 03 | 03 | -2 | 00 |
| 29 | 00 | 00 | 00 | 00 | 00 | 00 | 00 | 00 | 00 | 00 | 00 | -2 | 03 | 03 | 03 | 03 | 03 | 03 | 03 | 00 | 00 |
| 30 | 00 | 00 | 00 | 00 | 00 | 00 | 00 | 00 | 00 | 00 | 00 | 00 | 03 | 03 | 03 | 03 | 03 | 03 | 00 | 00 | 00 |

| P | 00 | 01 | 02 | 03 | 04 | 05 | 06 | 07 | 08 | 09 | 10 | 11 | 12 | 13 | 14 | 15 | 16 | 17 | 18 | 19 | 20 |
|---|----|----|----|----|----|----|----|----|----|----|----|----|----|----|----|----|----|----|----|----|----|
| T | 01 | 01 | 01 | 01 | 01 | 01 | 01 | 01 | 01 | 01 | 01 | 01 | 01 | 01 | 01 | 01 | 01 | 01 | 01 | 01 | 00 |
| -5 | 00 | 00 | 00 | 00 | 00 | 00 | 01 | 01 | 01 | 00 | 00 | 00 | 00 | 00 | 00 | 00 | 00 | 00 | 00 | 00 | 00 |
| -4 | 00 | 00 | 00 | 00 | 00 | 00 | 01 | 01 | 01 | 00 | 00 | 00 | 00 | 00 | 00 | 00 | 00 | 00 | 00 | 00 | 00 |
| -3 | 00 | 00 | 00 | 00 | 00 | 00 | 01 | 01 | 01 | 01 | 00 | 00 | 00 | 00 | 00 | 00 | 00 | 00 | 00 | 00 | 00 |
| -2 | 00 | 00 | 00 | 00 | 00 | 00 | 01 | 01 | 01 | 01 | 00 | 00 | 00 | 00 | 00 | 00 | 00 | 00 | 00 | 00 | 00 |
| -1 | 00 | 00 | 00 | 00 | 00 | 00 | 01 | 01 | 01 | 01 | 01 | 00 | 00 | 00 | 00 | 00 | 00 | 00 | 00 | 00 | 00 |
| 0 | 00 | 00 | 00 | 00 | 00 | 00 | 01 | 01 | 01 | 01 | 01 | 00 | 00 | 00 | 00 | 00 | 00 | 00 | 00 | 00 | 00 |
| 1 | 00 | 00 | 00 | 01 | 00 | 00 | 01 | 01 | 01 | 01 | 01 | 01 | 00 | 00 | 00 | 00 | 00 | 00 | 00 | 00 | 00 |
| 2 | 00 | 00 | 00 | 01 | 00 | 00 | 01 | 01 | 01 | 01 | 01 | 01 | 00 | 00 | 00 | 00 | 00 | 00 | 00 | 00 | 00 |
| 3 | 00 | 00 | 00 | 01 | 00 | 00 | 01 | 01 | 01 | 01 | 01 | 01 | 00 | 00 | 00 | 00 | 00 | 00 | 00 | 00 | 00 |
| 4 | 00 | 00 | 01 | 01 | 01 | 01 | 01 | 01 | 01 | 01 | 01 | 01 | 01 | 00 | 00 | 00 | 00 | 00 | 00 | 00 | 00 |
| 5 | 00 | 00 | 01 | 01 | 01 | -2 | -2 | 01 | 01 | 01 | 01 | 01 | 01 | 01 | 00 | 01 | 01 | 01 | 00 | 00 | 00 |
| 6 | 00 | 00 | 01 | 01 | 01 | 00 | 00 | 01 | 01 | 01 | 01 | 01 | 01 | 01 | 01 | 01 | 01 | 01 | 01 | 01 | 00 |
| 7 | 00 | 00 | 01 | 01 | -2 | 00 | 00 | -2 | 01 | 01 | 01 | 01 | 01 | 01 | 01 | 01 | 01 | 01 | 01 | 01 | 00 |
| 8 | 01 | 00 | 01 | 01 | 00 | 00 | 00 | 00 | -2 | 01 | 01 | 01 | 01 | 01 | 01 | 01 | 01 | 01 | 01 | 01 | 00 |
| 9 | 01 | 00 | 01 | -2 | 00 | 00 | 00 | 00 | 01 | 01 | 01 | 01 | 01 | 01 | 01 | 01 | 01 | 01 | 01 | 01 | 00 |
| 10 | 01 | 00 | 01 | 00 | 00 | 00 | 00 | 00 | -2 | 01 | 01 | 01 | 01 | 01 | 01 | 01 | 01 | 01 | 01 | 01 | 00 |
| 11 | 01 | 00 | 01 | 00 | 00 | 00 | 00 | 00 | 00 | -2 | 01 | 01 | 01 | 01 | 01 | 01 | -2 | 01 | 01 | 01 | 00 |
| 12 | 01 | 00 | -2 | 00 | 00 | 00 | 00 | 00 | 00 | 00 | 01 | 01 | 01 | 01 | 01 | 01 | 00 | 01 | -2 | 00 | 00 |
| 13 | 01 | 01 | 00 | 00 | 00 | 00 | 00 | 00 | 00 | 00 | 01 | 01 | 01 | 01 | 01 | 01 | 00 | 01 | 00 | 00 | 00 |
| 14 | 01 | 01 | 00 | 00 | 00 | 00 | 00 | 00 | 00 | 00 | -2 | 01 | 01 | 01 | -2 | 00 | -2 | 00 | 00 | 00 | 00 |
| 15 | 01 | 01 | 00 | 00 | 00 | 00 | 00 | 00 | 00 | 00 | 00 | 01 | 01 | 01 | 00 | 00 | 00 | 00 | 00 | 00 | 00 |
| 16 | 01 | 01 | 00 | 00 | 00 | 00 | 00 | 00 | 00 | 00 | 00 | 01 | 01 | 01 | -2 | 00 | 00 | 00 | 00 | 00 | 00 |
| 17 | 01 | 01 | 00 | 00 | 00 | 00 | 00 | 00 | 00 | 00 | 00 | -2 | 01 | 01 | 00 | 00 | 00 | 00 | 00 | 00 | 00 |
| 18 | 01 | -2 | 00 | 00 | 00 | 00 | 00 | 00 | 00 | 00 | 00 | 00 | 01 | 01 | 00 | 00 | 00 | 00 | 00 | 00 | 00 |
| 19 | 01 | 00 | 00 | 00 | 00 | 00 | 00 | 00 | 00 | 00 | 00 | 00 | 01 | 01 | 00 | 00 | 00 | 00 | 00 | 00 | 00 |
| 20 | 01 | 00 | 00 | 00 | 00 | 00 | 00 | 00 | 00 | 00 | 00 | 00 | -2 | 01 | 00 | 00 | 00 | 00 | 00 | 00 | 00 |
| 21 | 01 | 00 | 00 | 00 | 00 | 00 | 00 | 00 | 00 | 00 | 00 | 00 | -2 | 00 | 00 | 00 | 00 | 00 | 00 | 00 | 00 |
| 22 | 01 | 00 | 00 | 00 | 00 | 00 | 00 | 00 | 00 | 00 | 00 | 00 | 00 | 00 | 00 | 00 | 00 | 00 | 00 | 00 | 00 |
| 23 | -2 | 00 | 00 | 00 | 00 | 00 | 00 | 00 | 00 | 00 | 00 | 00 | 00 | 00 | 00 | 00 | 00 | 00 | 00 | 00 | 00 |

RADIO-FREQUENCY IDENTIFICATION (RFID) PRINTER ANTENNA

CROSS-REFERENCE TO RELATED APPLICATIONS

This application claims priority pursuant to 35 U.S.C. 119(a) to Chinese Application No. 202211126621.5, filed Sep. 16, 2022, which application is incorporated herein by reference in its entirety.

FIELD OF THE INVENTION

The present disclosure relates generally to apparatuses, systems, and methods for manufacturing radio-frequency identification (RFID) tags, labels, media, and/or the like. More particularly, various embodiments of the present disclosure provide example RFID printer antennae for example implementations in example RFID printers to encode and/or decode RFID tags, RFID labels, RFID media, and/or the like.

BACKGROUND

RFID tags (also referred to as RFID labels) can be implemented as parts of tracking systems by utilizing radio frequency and electromagnetic fields to search, identify, and/or track objects, items, and people. For example, digital data and/or information may be encoded in RFID tags that are attached to objects, items, and people. In such an example, when these objects, items, and people move, an RFID reader may capture digital data and/or information from these RFID tags via radio frequency (RF) signals.

Applicant has identified many deficiencies and problems associated with existing methods, apparatus, and systems related to manufacturing RFID tags.

BRIEF SUMMARY

Various embodiments described herein relate to methods, apparatuses, and systems that provide technical advantages and benefits on improving the performance of RFID printers. In particular, various embodiments provide example RFID printer antennae that can be implemented in example RFID printers.

In accordance with various embodiments of the present disclosure, an example RFID printer antenna for an example RFID printer is provided. In some embodiments, the example RFID printer antenna comprises a plurality of axial RFID printer antenna segments and a plurality of oblique RFID printer antenna segments. In some embodiments, the plurality of axial RFID printer antenna segments are in parallel arrangements with one another. In some embodiments, each of the plurality of oblique RFID printer antenna segments is connected to two of the plurality of axial RFID printer antenna segments at oblique angles.

In some embodiments, the plurality of axial RFID printer antenna segments comprises: a plurality of center axial RFID printer antenna segments, a plurality of upper axial RFID printer antenna segments, and a plurality of lower axial RFID printer antenna segments. In some embodiments, the plurality of center axial RFID printer antenna segments are coaxial with one another. In some embodiments, the plurality of upper axial RFID printer antenna segments are coaxial with one another and positioned on an upper side of the plurality of center axial RFID printer antenna segments. In some embodiments, the plurality of lower axial RFID printer antenna segments are coaxial with one another and positioned on a lower side of the plurality of center axial RFID printer antenna segments.

In some embodiments, the plurality of axial RFID printer antenna segments comprises a first axial RFID printer antenna segment and a second axial RFID printer antenna segment.

In some embodiments, the plurality of oblique RFID printer antenna segments comprises a first oblique RFID printer antenna segment connecting the first axial RFID printer antenna segment and the second axial RFID printer antenna segment.

In some embodiments, a first antenna segment connection angle between the first axial RFID printer antenna segment and the first oblique RFID printer antenna segment is not 0°, 90° or 180°.

In some embodiments, the first antenna segment connection angle is between 90° (exclusive) and 180° (exclusive). In some embodiments, the first antenna segment connection angle is 135°.

In some embodiments, the first antenna segment connection angle is between 0° (exclusive) and 90° (exclusive). In some embodiments, the first antenna segment connection angle is 45°.

In some embodiments, the plurality of axial RFID printer antenna segments comprises a third axial RFID printer antenna segment. In some embodiments, the plurality of oblique RFID printer antenna segments comprises a second oblique RFID printer antenna segment connecting the second axial RFID printer antenna segment and the third axial RFID printer antenna segment.

In accordance with various embodiments of the present disclosure, an example RFID printer is provided. In some embodiments, the example RFID printer comprises a printed circuit board (PCB) antenna.

In some embodiments, the PCB antenna comprises a top PCB antenna layer and a bottom PCB antenna layer. In some embodiments, the top PCB antenna layer is disposed on top of the bottom PCB antenna layer and comprises an RFID printer antenna. In some embodiments, the RFID printer antenna comprises a plurality of axial RFID printer antenna segments and a plurality of oblique RFID printer antenna segments. In some embodiments, the plurality of axial RFID printer antenna segments are in parallel arrangements with one another. In some embodiments, each of the plurality of oblique RFID printer antenna segments is connected to two of the plurality of axial RFID printer antenna segments at oblique angles.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which:

FIG. 7 provides an example diagram illustrating example testing results of encoding an example RFID tag by an example RFID printer in accordance with various embodiments of the present disclosure;

FIG. 8 provides an example diagram illustrating example testing results of encoding the example RFID tag of FIG. 7 by an RFID printer that does not incorporate embodiments of the present disclosure;

FIG. 9 provides an example diagram illustrating example testing results of encoding an example RFID tag by an example RFID printer in accordance with various embodiments of the present disclosure;

FIG. 10 provides an example diagram illustrating example testing results of encoding the example RFID tag of FIG. 9 by an RFID printer that does not incorporate embodiments of the present disclosure;

FIG. 11 provides an example diagram illustrating example testing results of encoding an example RFID tag by an example RFID printer in accordance with various embodiments of the present disclosure;

FIG. 12 provides an example diagram illustrating example testing results of encoding the example RFID tag of FIG. 11 by an RFID printer that does not incorporate embodiments of the present disclosure;

FIG. 13 provides an example diagram illustrating example testing results of encoding an example RFID tag by an example RFID printer in accordance with various embodiments of the present disclosure; and FIG. 14 provides an example diagram illustrating example testing results of encoding the example RFID tag of FIG. 13 by an RFID printer that does not incorporate embodiments of the present disclosure.

DETAILED DESCRIPTION OF THE INVENTION

Figure 1:
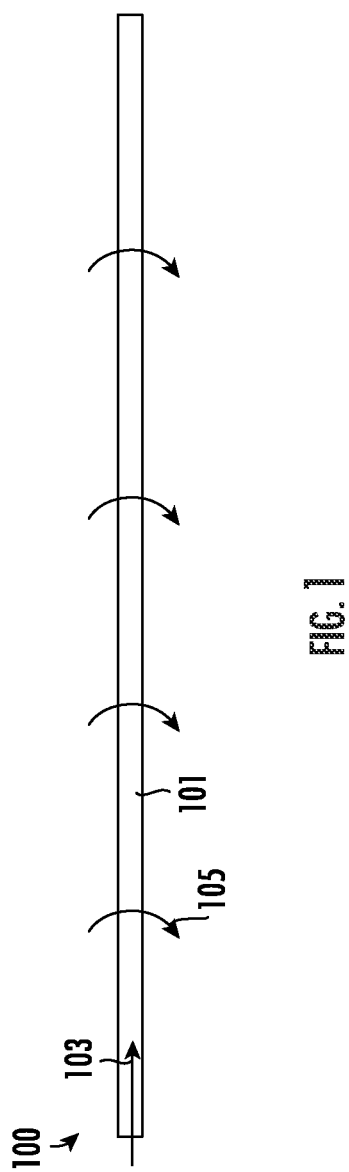
FIG. 1 illustrates an example RFID printer antenna of an example RFID printer.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements Like numbers refer to like elements throughout.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

As described above, RFID tags may be utilized to search, identify, and/or track objects, items, and people. In some embodiments, examples of RFID tags may be in the form of passive tags that are powered by energy from one or more RF interrogation signals that are transmitted by an example RFID printer or an example RFID reader. In some embodiments, examples of RFID tags may be in the form of active tags that are powered by a power source (such as, but not limited to, a battery).

In some embodiments, an example RFID tag may comprise an example RFID inlay. In some embodiments, the example RFID inlay comprises an RFID tag integrated circuit and an RFID tag antenna. In some embodiments, both the RFID tag integrated circuit and the RFID tag antenna are disposed on an RFID tag substrate.

In some examples, the RFID tag integrated circuit may include a memory circuitry that stores digital data (such as, but not limited to, an electronic product code (EPC), a unique tag identification (ID) number). For example, an example RFID printer may encode a unique tag ID number to the RFID tag integrated circuit of the example RFID tag. When the example RFID tag is attached to an object, the unique tag ID number can be associated with the object for searching and tracking purposes.

In the present disclosure, an RFID printer refers to an apparatus that can encode digital information and/or data (such as, but not limited to, an unique tag ID number) into an example RFID inlay of an example RFID tag, and/or decode digital information and/or data (such as, but not limited to, an unique tag ID number) from an example RFID inlay of an example RFID tag.

For example, the RFID printer may comprise an RFID printer antenna. In some embodiments, the RFID printer antenna may be secured to a printed circuit board (PCB), forming a PCB antenna. In such an example, the RFID printer antenna functions as a transducer. In particular, when an electric current flows through the RFID printer antenna, a magnetic field is formed around the RFID printer antenna. When an alternating current flows through the RFID printer antenna, an electromagnetic field is formed around the RFID printer antenna and propagates from the RFID printer antenna in the form of electromagnetic waves. When the frequency of the electromagnetic waves is above a threshold (for example, 100 kHz), such electromagnetic waves are also referred to as RF signals because they can propagate in the air without being absorbed by the surface of the earth.

In some embodiments, digital data and/or information can be embedded into RF signals so that these digital data and/or information can travel through air. For example, digital data and/or information (such as, but not limited to, the unique tag ID number) that is to be written to the RFID inlay of the RFID tag may be embedded in the RF signals, and the RFID printer antenna of the RFID printer can emit such RF signals to the RFID tag.

As described above, the example RFID tag may comprise an RFID tag antenna. In some embodiments, the RFID printer antenna of the RFID printer causes the RF signals to propagate to the RFID tag antenna, conveying digital data and/or information to the RFID tag antenna (and/or inducing energy in the RFID tag antenna). In some embodiments, the RFID tag integrated circuit of the RFID tag is connected to the RFID tag antenna, and the digital data and/or information embedded in the RF signals can be conveyed to the RFID tag integrated circuit and stored in the RFID tag integrated circuit.

In some embodiments, the RFID tag integrated circuit of the RFID tag may cause the RFID tag antenna to transmit an RF signal back to the RFID printer antenna of the RFID printer. In some embodiments, the RF signal is an acknowledgment signal that confirms the receipt of digital data and/or information (such as, but not limited to, the unique tag ID number) and/or to confirm that the digital data and/or information (such as, but not limited to, the unique tag ID number) has been encoded in the RFID tag integrated circuit of the RFID tag. In some embodiments, an RFID printer may print images (such as, but not limited to, barcodes) on the RFID tag in addition to encoding the RFID inlay of the RFID tag.

There are many technical challenges, difficulties, and limitations in manufacturing RFID tags and labels, including, but not limited to, encoding data to and/or decoding data from the RFID tags and labels.

As described above, an example RFID printer antenna in an example RFID printer (such as, but not limited to, an example industrial RFID printer) is positioned adjacent to an example RFID tag to encode digital data and/or information to the RFID tag and/or decode digital data and/or information from the RFID tag. Referring now to FIG. 1, an example schematic diagram 100 illustrating an RFID printer antenna 101 for an example RFID printer is provided.

In the example shown in FIG. 1, the example RFID printer antenna 101 is in the form of a straight line antenna. In some embodiments, the example RFID printer antenna 101 is a conductor. For example, the example RFID printer antenna 101 comprises conductive materials such as, but not limited not, aluminum, copper, conductive ink, and/or the like.

In some embodiments, the example RFID printer antenna 101 may receive an electric current. In the example shown in FIG. 1, the flow direction 103 of the electric current in the example RFID printer antenna 101 is shown.

In some embodiments, the example RFID printer antenna 101 may produce an electromagnetic field when the electric current passes through the example RFID printer antenna 101. In some embodiments, the electromagnetic field produced by the example RFID printer antenna 101 propagates RF signals with embedded digital data and/or information, similar to those described above.

In some embodiments, the propagating direction of the RF signals is determined by the magnetic force direction of the electromagnetic field produced by the example RFID printer antenna 101. In some embodiments, the magnetic force direction of the electromagnetic field produced by an electric current can be determined by the right-hand screw rule.

In particular, the right-hand screw rule associates the flow direction of an electric current in a conductor with the magnetic force direction of the electromagnetic field produced by the electric current. In the example shown in FIG. 1, the example magnetic force direction 105 of the electromagnetic field produced by the electric current along the flow direction 103 in the example RFID printer antenna 101 is shown. In some embodiments, the electromagnetic field surrounding the example RFID printer antenna 101 is similar to concentric circles, where the center of the concentric circles is at the axis of the example RFID printer antenna 101. In some embodiments, the magnetic force direction 105 of the electromagnetic field produced by the example RFID printer antenna 101 is dependent upon the flow direction 103 of the electric current in the example RFID printer antenna 101.

Because the electric current flows in the example RFID printer antenna 101, the shape/layout and the direction of the example RFID printer antenna 101 define the flow direction 103 of the electric current, which in turn impacts the example magnetic force direction 105 of the electromagnetic field and the propagating direction of the RF signals from the example RFID printer antenna 101.

While FIG. 1 illustrates an example RFID printer antenna 101 that can be implemented in an example RFID printer to encode digital information and/or data to (and/or decode digital information and/or data from) an example RFID tag, it is noted that the example RFID printer antenna 101 is faced with many technical limitations and disadvantages.

For example, the relative positional relationship between the direction of the example RFID printer antenna in the RFID printer and the direction of the RFID tag antenna in the RFID tag can impact the amount of electromagnetic energy/radiation induced in the RFID tag antenna. As described above, the direction of the example RFID printer antenna 101 affects the flow direction of the electric current in the example RFID printer antenna 101, which in turn affects the example magnetic force direction 105 of the electromagnetic field and the propagating direction of the RF signals from the example RFID printer antenna 101. When the direction of the example RFID printer antenna 101 is parallel to the direction of RFID tag antenna in the RFID tag, the RF signals are propagated to the RFID tag antenna at an optimal angle, such that the radiation induced in the RFID tag antenna is the strongest and the efficiency of the energy transfer from the example RFID printer antenna 101 to the RFID tag antenna is the highest. When the direction of the example RFID printer antenna 101 is not parallel to the direction of RFID tag antenna in the RFID tag, the RF signals are propagated to the RFID tag antenna at suboptimal angles, where the radiation induced in the RFID tag antenna is the reduced and the efficiency of the energy transfer from the example RFID printer antenna 101 to the RFID tag antenna is the reduced.

As such, the shape and the layout of the example RFID printer antenna 101 (including, but not limited to, the direction of the example RFID printer antenna 101) can cause technical effects such as, but not limited to, impacting the amount of energy induced in the RFID tag antenna in the RFID tag (and/or the amount of digital data and/or information encoded and/or decoded with the example RFID tag).

Referring back to the example RFID printer antenna 101 shown in FIG. 1, the example RFID printer antenna 101 is in the shape of a straight line. In this example, the direction of the example RFID printer antenna 101 can be in a parallel arrangement with an RFID tag antenna that is also in the shape of a straight line. In such an arrangement, the RF signals are propagated to the RFID tag antenna at an optimal angle, providing the strongest radiation induced in the RFID tag antenna and the highest efficiency of the energy transfer from the example RFID printer antenna 101 to the RFID tag antenna. However, there are many RFID tags with RFID antennae that are not in the form of a straight line.

Figure 2:
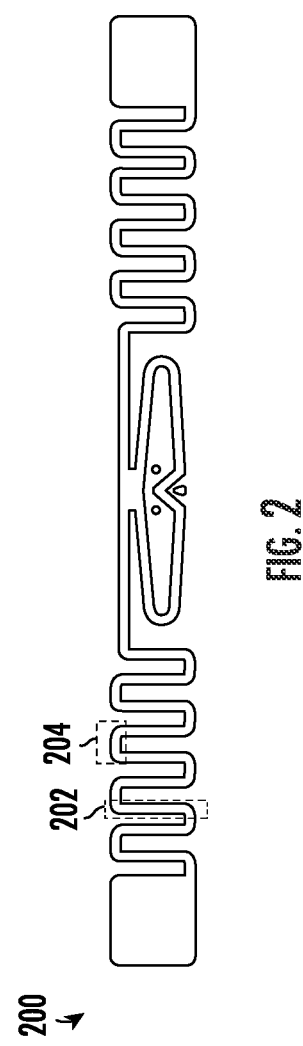
FIG. 2 illustrates an example RFID tag inlay of an example RFID tag in accordance with some embodiments of the present disclosure.

Referring now to FIG. 2, an example RFID tag inlay 200 of an example RFID tag in accordance with some embodiments of the present disclosure is illustrated. In the example shown in FIG. 2, the example RFID tag inlay 200 comprises RFID tag antenna segments that include, but not limited to, the RFID tag antenna segment 202 and the RFID tag antenna segment 204.

In the example shown in FIG. 2, the RFID tag antenna segment 202 and the RFID tag antenna segment 204 are in a perpendicular arrangement with one another. When the example RFID printer antenna 101 shown in FIG. 1 is implemented to encode digital data and/or information to the example RFID tag inlay 200 shown in FIG. 2, the example RFID printer antenna 101 cannot be in parallel arrangement with both the RFID tag antenna segment 202 and the RF ID tag antenna segment 204 because of the straight line shape of the example RFID printer antenna 101. As such, the radiation induced in the RFID tag antenna (including the RFID tag antenna segment 202 and the RFID tag antenna segment 204) is weakened and suboptimal, providing lower efficiency in energy transfer from the example RFID printer antenna 101 to the example RFID tag inlay 200.

Figure 3:
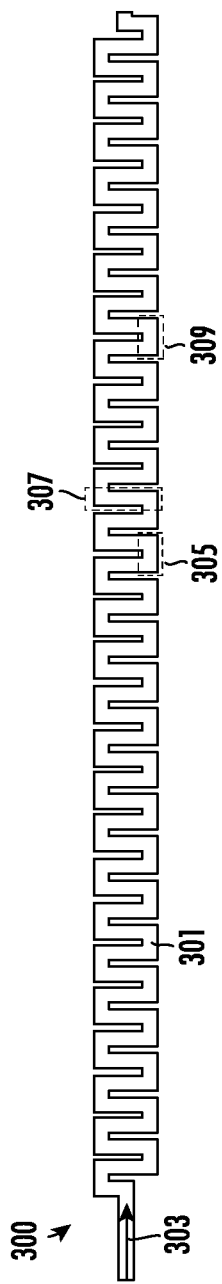
FIG. 3 illustrates an example RFID printer antenna of an example RFID printer.

Referring now to FIG. 3, an example schematic diagram 300 illustrating an RFID printer antenna 301 is provided.

In the example shown in FIG. 3, the example RFID printer antenna 301 is in the form of a looped antenna comprising a plurality of antenna segments that are connected to one another. In particular, each of the antenna segments is either in a parallel arrangement with another antenna segment or in a perpendicular arrangement with another antenna segment. For example, the example RFID printer antenna 301 comprises an RFID printer antenna segment 305, an RFID printer antenna segment 307, and an RFID printer antenna segment 309. In the example shown in FIG. 3, the RFID printer antenna segment 305 is in a parallel arrangement with the RFID printer antenna segment 309 and is in a perpendicular arrangement with the RFID printer antenna segment 307.

Similar to the example RFID printer antenna 101 described above in connection with FIG. 1, the example RFID printer antenna 301 comprises conductive materials such as, but not limited not, aluminum, copper, conductive ink, and/or the like.

In some embodiments, the example RFID printer antenna 301 may receive an electric current. For example, the example RFID printer antenna 301 may be connected to a power source such as, but not limited to, a battery and/or a power outlet. FIG. 3 also illustrates the flow direction 303 of the electric current. In some embodiments, the example RFID printer antenna 301 may produce an electromagnetic field when the electric current passes through the example RFID printer antenna 301, propagating RF signals with embedded digital data and/or information to the RFID tag antenna of RFID tags, similar to those described above.

Comparing the example RFID printer antenna 301 shown in FIG. 3 with the example RFID printer antenna 101 shown in FIG. 1, the example RFID printer antenna 301 comprises antenna segments that are in perpendicular arrangements with one another. The shape and the layout of the example RFID printer antenna 301 enable the example RFID printer antenna 301 to provide technical benefits and improvements over the example RFID printer antenna 101.

For example, when encoding the example RFID tag inlay 200 shown in FIG. 2, the example RFID printer antenna 301 causes stronger radiation to be induced in the RFID tag antenna and higher efficiency of the energy transfer from the example RFID printer antenna 301 to the RFID tag antenna of the example RFID tag inlay 200. As described above, when the direction of the example RFID printer antenna is parallel to the direction of RFID tag antenna in the RFID tag, the RF signals are propagated to the RFID tag antenna at an optimal angle, such that the radiation induced in the RFID tag antenna is the strongest and the efficiency of the energy transfer from the example RFID printer antenna to the RFID tag antenna is the highest. In the example shown in FIG. 2 and FIG. 3, the perpendicular arrangements among the antenna segments in the example RFID printer antenna 301 correspond to the perpendicular arrangements among the RFID tag antenna segments in the example RFID tag inlay 200. For example, when the example RFID printer antenna 301 is implemented to encode the example RFID tag inlay 200, the RFID printer antenna segment 305 of the example RFID printer antenna 301 can be in a parallel arrangement with the RFID tag antenna segment 204 of the example RFID tag inlay 200, and the RFID printer antenna segment 307 of the example RFID printer antenna 301 can be in a parallel arrangement with the RFID tag antenna segment 202 of the example RFID tag inlay 200.

As such, the shape and the layout of the example RFID printer antenna 301 (including, but not limited to, the perpendicular arrangements between RFID printer antenna segments of the example RFID printer antenna 301) enable the example RFID printer antenna 301 to provide technical advantages and improvements over the example RFID printer antenna 101, including, but not limited to, stronger radiation induced in the RFID tag antenna and higher efficiency of the energy transfer from the example RFID printer antenna to the RFID tag antenna.

While the example RFID printer antenna 301 can provide technical improvements over the RFID printer antenna 101, it is noted that compatibilities of the example RFID printer antenna 301 among different types of RFID tags can still be limited. For example, while the example RFID printer antenna 301 can overcome technical challenges associated with encoding digital data and/or information to the example RFID tag inlay 200 shown in FIG. 2, it is noted that shapes and layouts of other types of RFID tag antennae can differ from those shown in FIG. 3.

Figure 4:
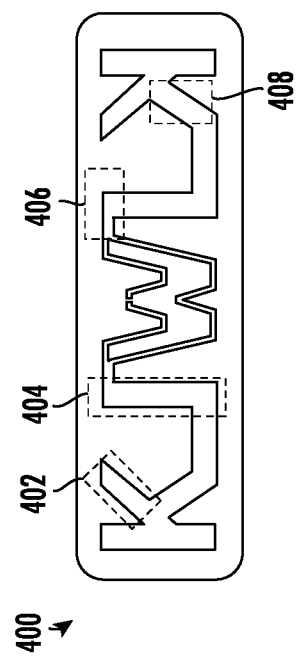
FIG. 4 illustrates an example RFID tag inlay of an example RFID tag in accordance with some embodiments of the present disclosure.

Referring now to FIG. 4, an example RFID tag inlay 400 of an example RFID tag in accordance with some embodiments of the present disclosure is illustrated. In the example shown in FIG. 4, the example RFID tag inlay 400 comprises RFID tag antenna segments that include, but not limited to, the RFID tag antenna segment 402, the RFID tag antenna segment 404, the RFID tag antenna segment 406, and the RFID tag antenna segment 408.

In the example shown in FIG. 4, the RFID tag antenna segment 404 and the RFID tag antenna segment 406 are in a perpendicular arrangement with one another. However, the RFID tag antenna segment 402 and the RFID tag antenna segment 408 are at oblique angles with the RFID tag antenna segment 404. For example, the RFID tag antenna segment 402 may be at 45 degrees angle with the RFID tag antenna segment 404.

When the example RFID printer antenna 301 shown in FIG. 3 is implemented to encode digital data and/or information to the example RFID tag inlay 400 shown in FIG. 4, the example RFID printer antenna 301 cannot be in parallel arrangement with all of the RFID tag antenna segment 402, the RFID tag antenna segment 404, the RFID tag antenna segment 406, and the RFID tag antenna segment 408.

For example, while the RFID printer antenna segment 305 of the example RFID printer antenna 301 can be in a parallel arrangement with the RFID tag antenna segment 406 of the example RFID tag inlay 400, and the RFID printer antenna segment 307 of the example RFID printer antenna 301 can be in a parallel arrangement with the RFID tag antenna segment 404 of the example RFID tag inlay 400, the RFID tag antenna segment 402 and the RFID tag antenna segment 408 are not in any parallel arrangement with any of the RFID printer antenna segments of the example RFID printer antenna 301. As such, the radiation induced in the RFID tag antenna (including the RFID tag antenna segment 402 and the RFID tag antenna segment 408) of the example RFID tag inlay 400 shown in FIG. 4 is weakened and suboptimal, providing lower efficiency in energy transfer from the example RFID printer antenna 301 to the example RFID tag inlay 400.

Referring now to FIG. 5A to FIG. 5D, example diagrams illustrating an example RFID printer antenna 500 are provided. In particular, the example RFID printer antenna 500 can overcome technical challenges and limitations faced by RFID printer antennae such as, but not limited to, the example RFID printer antenna 101 shown in FIG. 1 and the example RFID printer antenna 301 shown in FIG. 3.

Figure 5A:
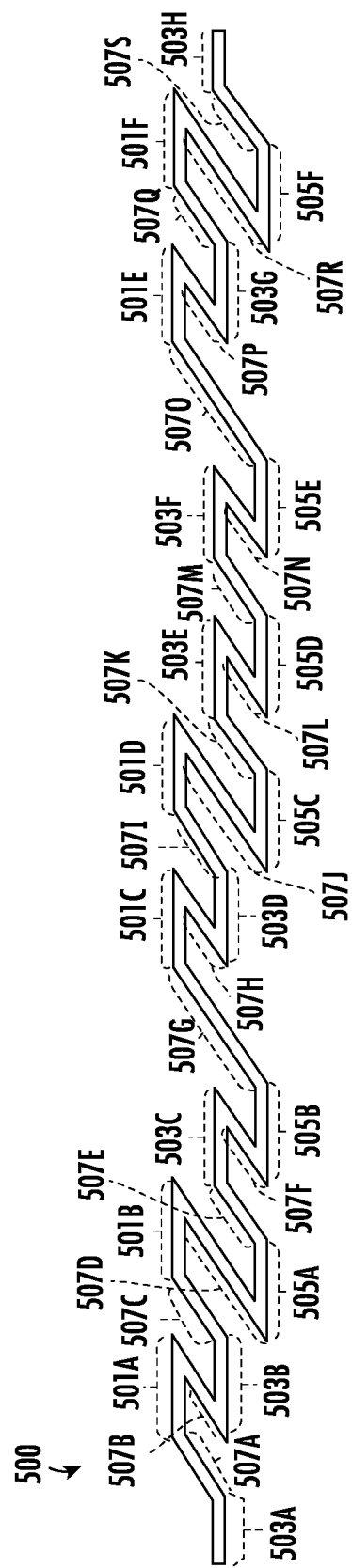
FIG. 5A illustrates an example RFID printer antenna in accordance with some embodiments of the present disclosure.

In the example shown in FIG. 5A, the example RFID printer antenna 500 comprises a plurality of axial RFID printer antenna segments and a plurality of oblique RFID printer antenna segments.

In the present disclosure, axial RFID printer antenna segments refer to segments of the example RFID printer antenna that are aligned with an axis (or multiple axes that are in parallel arrangements with one another). In other words, the axial RFID printer antenna segments are in parallel arrangements with one another.

In the example shown in FIG. 5A, the axial RFID printer antenna segments include the axial RFID printer antenna segment 501A, the axial RFID printer antenna segment 501B, the axial RFID printer antenna segment 501C, the axial RFID printer antenna segment 501D, the axial RFID printer antenna segment 501E, the axial RFID printer antenna segment 501F, the axial RFID printer antenna segment 503A, the axial RFID printer antenna segment 503B, the axial RFID printer antenna segment 503C, the axial RFID printer antenna segment 503D, the axial RFID printer antenna segment 503E, the axial RFID printer antenna segment 503F, the axial RFID printer antenna segment 503G, the axial RFID printer antenna segment 503H, the axial RFID printer antenna segment 505A, the axial RFID printer antenna segment 505B, the axial RFID printer antenna segment 505C, the axial RFID printer antenna segment 505D, the axial RFID printer antenna segment 505E, and the axial RFID printer antenna segment 505F.

Providing axial RFID printer antenna segments in an RFID printer is not merely a design choice. In example embodiments where an example RFID printer antenna comprises axial RFID printer antenna segments, the example RFID printer antenna (as well as the example RFID printer that implements the example RFID printer antenna) can provide various technical improvements and advantages, as well as various technical functions that many RFID printer antennae and RFID printers cannot provide.

For example, each of the axial RFID printer antenna segments can produce an electromagnetic field. Because the axial RFID printer antenna segments are in parallel arrangements with one another, electromagnetic fields produced by different axial RFID printer antenna segments may superpose upon one another, enhancing the strengths of the magnetic forces and the RF signals. When an example RFID tag is encoded by an example RFID printer antenna comprising axial RFID printer antenna segments, the radiation induced in the RFID tag antenna is stronger and the efficiency of energy transfer is higher compared to those of RFID printer antennae that do not comprise axial RFID printer antenna segments. In other words, axial RFID printer antenna segments provide technical contributions in solving technical issues that are plagued by many RFID printers (including, but not limited to, limited compatibility with only certain types of RFID tags, low radiation induced in the RFID tag antenna and low energy transfer efficiency).

Figure 5B:
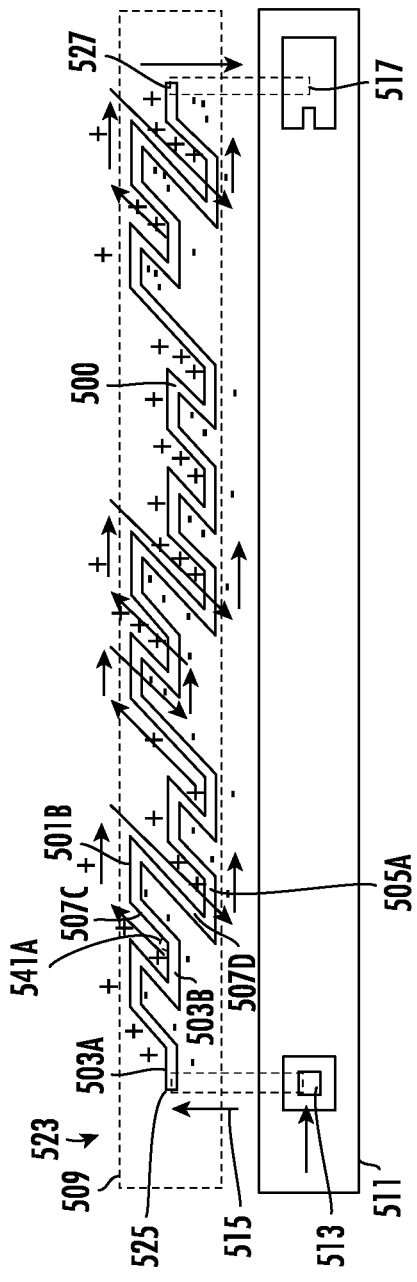
FIG. 5B and FIG. 5C illustrate the example RFID printer antenna shown in FIG. 5A as an example part of an example printed circuit board (PCB) antenna for an example RFID printer in accordance with some embodiments of the present disclosure.
Figure 5C:
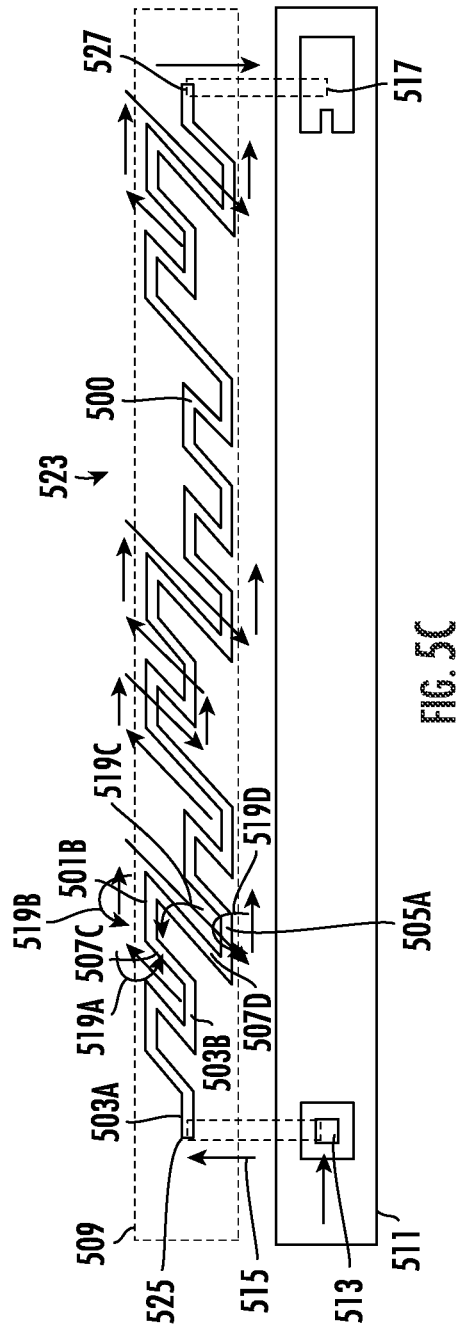

As illustrated further in connection with FIG. 5B and FIG. 5C, the example RFID printer antenna 500 may receive an electric current. In such an example, one of the axial RFID printer antenna segments is the first/initial segment of the example RFID printer antenna 500 that receives the electric current, which is also referred to as a current input antenna segment of the example RFID printer antenna 500. In the example shown in FIG. 5A, the axial RFID printer antenna segment 503A is the current input antenna segment.

In some embodiments, the plurality of axial RFID printer antenna segments comprises a plurality of center axial RFID printer antenna segments, a plurality of upper axial RFID printer antenna segments, and a plurality of lower axial RFID printer antenna segments.

In some embodiments, the plurality of center axial RFID printer antenna segments are coaxial with one another. In particular, the plurality of center axial RFID printer antenna segments are aligned with a central axis of the example RFID printer antenna 500.

In the example shown in FIG. 5A, the center axial RFID printer antenna segments include the axial RFID printer antenna segment 503A, the axial RFID printer antenna segment 503B, the axial RFID printer antenna segment 503C, the axial RFID printer antenna segment 503D, the axial RFID printer antenna segment 503E, the axial RFID printer antenna segment 503F, the axial RFID printer antenna segment 503G, the axial RFID printer antenna segment 503H.

In some embodiments, the plurality of upper axial RFID printer antenna segments are coaxial with one another and positioned on an upper side of the plurality of center axial RFID printer antenna segments. In other words, the plurality of upper axial RFID printer antenna segments are aligned with an axis that is positioned on an upper side of the central axis of the example RFID printer antenna 500.

In the example shown in FIG. 5A, the upper axial RFID printer antenna segments include the axial RFID printer antenna segment 501A, the axial RFID printer antenna segment 501B, the axial RFID printer antenna segment 501C, the axial RFID printer antenna segment 501D, the axial RFID printer antenna segment 501E, the axial RFID printer antenna segment 501F.

In some embodiments, the plurality of lower axial RFID printer antenna segments are coaxial with one another and positioned on a lower side of the plurality of center axial RFID printer antenna segments. In other words, the plurality of lower axial RFID printer antenna segments are aligned with an axis that is positioned on a lower side of the central axis of the example RFID printer antenna 500.

In some embodiments, the lower side of the central axis of the example RFID printer antenna 500 is opposite to the upper side of the central axis of the example RFID printer antenna 500. In other words, the plurality of lower axial RFID printer antenna segments and the plurality of upper axial RFID printer antenna segments are positioned on opposite sides of the plurality of center RFID printer antenna segments.

In the example shown in FIG. 5A, the lower axial RFID printer antenna segments include the axial RFID printer antenna segment 505A, the axial RFID printer antenna segment 505B, the axial RFID printer antenna segment 505C, the axial RFID printer antenna segment 505D, the axial RFID printer antenna segment 505E, and the axial RFID printer antenna segment 505F.

As described above, axial RFID printer antenna segments of the example RFID printer antenna 500 shown in FIG. 5A comprise three different types of antenna segments (i.e. the center axial RFID printer antenna segments, the upper axial RFID printer antenna segments, and the lower axial RFID printer antenna segments) that are aligned with three parallel axes. The arrangements of the center axial RFID printer antenna segments, the upper axial RFID printer antenna segments, and the lower axial RFID printer antenna segments shown in FIG. 5A are not merely design choices. In example embodiments where an example RFID printer antenna comprises the center axial RFID printer antenna segments, the upper axial RFID printer antenna segments, and the lower axial RFID printer antenna segments that are arranged as shown in FIG. 5A, the example RFID printer antenna (as well as the example RFID printer that implements the example RFID printer antenna) can provide various technical improvements and advantages, as well as various technical functions that many RFID printer antennae and RFID printers cannot provide.

For example, because the center axial RFID printer antenna segments, the upper axial RFID printer antenna segments, and the lower axial RFID printer antenna segments are aligned to three parallel axes, the electromagnetic fields produced by the center axial RFID printer antenna segments, the upper axial RFID printer antenna segments, and the lower axial RFID printer antenna segments are spread across a wider range along the width of the RFID printer antenna (as compared to, for example, the electromagnetic field generated by the RFID printer antenna 101 described above in connection with FIG. 1). When an example RFID tag is encoded by an example RFID printer antenna comprising the center axial RFID printer antenna segments, the upper axial RFID printer antenna segments, and the lower axial RFID printer antenna segments that are arranged as shown in FIG. 5A, the radiation induced in the RFID tag antenna is stronger and the efficiency of energy transfer is higher compared to those of the RFID printer antenna 101 described above in connection with FIG. 1. In other words, the arrangements of the center axial RFID printer antenna segments, the upper axial RFID printer antenna segments, and the lower axial RFID printer antenna segments as shown in FIG. 5A provide technical contributions in solving technical issues that are plagued by many RFID printers (including, but not limited to, limited compatibility with only certain types of RFID tags, low radiation induced in the RFID tag antenna and low energy transfer efficiency).

While the description above provides an example where the axial RFID printer antenna segments include three types of antenna segments that are aligned with three different parallel axes, it is noted that the scope of the present disclosure is not limited to the description above. In some examples, example RFID printer antenna segments may include more than three types of antenna segments that are aligned with more than three parallel axes, or less than three types of antenna segments that are aligned with less than three parallel axes.

In the present disclosure, oblique RFID printer antenna segments refer to segments of the example RFID printer antenna that are at oblique angles with one or more axial RFID printer antenna segments. In some embodiments, the oblique RFID printer antenna segments are in parallel arrangements with one another.

In the example shown in FIG. 5A, the oblique RFID printer antenna segments include the oblique RFID printer antenna segment 507A, the oblique RFID printer antenna segment 507B, the oblique RFID printer antenna segment 507C, the oblique RFID printer antenna segment 507D, the oblique RFID printer antenna segment 507E, the oblique RFID printer antenna segment 507F, the oblique RFID printer antenna segment 507G, the oblique RFID printer antenna segment 507H, the oblique RFID printer antenna segment 507I, the oblique RFID printer antenna segment 507J, the oblique RFID printer antenna segment 507K, the oblique RFID printer antenna segment 507L, the oblique RFID printer antenna segment 507M, the oblique RFID printer antenna segment 507N, the oblique RFID printer antenna segment 507O, the oblique RFID printer antenna segment 507P, the oblique RFID printer antenna segment 507Q, the oblique RFID printer antenna segment 507R, and the oblique RFID printer antenna segment 507S.

In some embodiments, each of the plurality of oblique RFID printer antenna segments connects two of the plurality of axial RFID printer antenna segments at oblique angles. In the present disclosure, the term "oblique angle" refers to an angle that is not a right angle or any integer multiple of a right angle (e.g. not 0 degrees, 90 degrees, 180 degrees, etc.).

For example, an example oblique RFID printer antenna connects a center axial RFID printer antenna segment with an upper axial RFID printer antenna segment. In some embodiments, an example oblique RFID printer antenna connects a center axial RFID printer antenna segment with a lower axial RFID printer antenna segment. In some embodiments, an example oblique RFID printer antenna connects an upper axial RFID printer antenna segment with a lower axial RFID printer antenna segment.

In the example shown in FIG. 5A, the oblique RFID printer antenna segment 507A connects the axial RFID printer antenna segment 503A (which is a center RFID printer antenna segment) and the axial RFID printer antenna segment 501A (which is an upper axial RFID printer antenna segment) at oblique angles. The oblique RFID printer antenna segment 507B connects the axial RFID printer antenna segment 501A (which is an upper axial RFID printer antenna segment) and the axial RFID printer antenna segment 503B (which is a center RFID printer antenna segment) at oblique angles. The oblique RFID printer antenna segment 507C connects the axial RFID printer antenna segment 503B (which is a center RFID printer antenna segment) and the axial RFID printer antenna segment 501B

(which is an upper axial RFID printer antenna segment) at oblique angles. The oblique RFID printer antenna segment 507D connects the axial RFID printer antenna segment 501B (which is an upper axial RFID printer antenna segment) and the axial RFID printer antenna segment 505A (which is a lower axial RFID printer antenna segment) at oblique angles. The oblique RFID printer antenna segment 507E connects the axial RFID printer antenna segment 505A (which is a lower axial RFID printer antenna segment) and the axial RFID printer antenna segment 503C (which is a center RFID printer antenna segment) at oblique angles. The oblique RFID printer antenna segment 507F connects the axial RFID printer antenna segment 503C (which is a center RFID printer antenna segment) and the axial RFID printer antenna segment 505B (which is a lower axial RFID printer antenna segment) at oblique angles. The oblique RFID printer antenna segment 507G connects the axial RFID printer antenna segment 505B (which is a lower axial RFID printer antenna segment) and the axial RFID printer antenna segment 501C (which is an upper axial RFID printer antenna segment) at oblique angles. The oblique RFID printer antenna segment 507H connects the axial RFID printer antenna segment 501C (which is an upper axial RFID printer antenna segment) and the axial RFID printer antenna segment 503D (which is a center RFID printer antenna segment) at oblique angles. The oblique RFID printer antenna segment 507I connects the axial RFID printer antenna segment 503D (which is a center RFID printer antenna segment) and the axial RFID printer antenna segment 501D (which is an upper axial RFID printer antenna segment) at oblique angles. The oblique RFID printer antenna segment 507J connects the axial RFID printer antenna segment 501D (which is an upper axial RFID printer antenna segment) and the axial RFID printer antenna segment 505C (which is a lower axial RFID printer antenna segment) at oblique angles. The oblique RFID printer antenna segment 507K connects the axial RFID printer antenna segment 505C (which is a lower axial RFID printer antenna segment) and the axial RFID printer antenna segment 503E (which is a center RFID printer antenna segment) at oblique angles. The oblique RFID printer antenna segment 507L connects the axial RFID printer antenna segment 503E (which is a center RFID printer antenna segment) and the axial RFID printer antenna segment 505D (which is a lower axial RFID printer antenna segment) at oblique angles. The oblique RFID printer antenna segment 507M connects the axial RFID printer antenna segment 505D (which is a lower axial RFID printer antenna segment) and the axial RFID printer antenna segment 503F (which is a center RFID printer antenna segment) at oblique angles. The oblique RFID printer antenna segment 507N connects the axial RFID printer antenna segment 503F (which is a center RFID printer antenna segment) and the axial RFID printer antenna segment 505E (which is a lower axial RFID printer antenna segment) at oblique angles. The oblique RFID printer antenna segment 507O connects the axial RFID printer antenna segment 505E (which is a lower axial RFID printer antenna segment) and the axial RFID printer antenna segment 501E (which is an upper axial RFID printer antenna segment) at oblique angles. The oblique RFID printer antenna segment 507P connects the axial RFID printer antenna segment 501E (which is an upper axial RFID printer antenna segment) and the axial RFID printer antenna segment 503G (which is a center RFID printer antenna segment) at oblique angles. The oblique RFID printer antenna segment 507Q connects the axial RFID printer antenna segment 503G (which is a center RFID printer antenna segment) and the axial RFID printer antenna segment 501F (which is an upper axial RFID printer antenna segment) at oblique angles. The oblique RFID printer antenna segment 507R connects the axial RFID printer antenna segment 501F (which is an upper axial RFID printer antenna segment) and the axial RFID printer antenna segment 505F (which is a lower axial RFID printer antenna segment) at oblique angles. The oblique RFID printer antenna segment 507S connects the axial RFID printer antenna segment 505F (which is a lower axial RFID printer antenna segment) and the axial RFID printer antenna segment 503H (which is a center RFID printer antenna segment) at oblique angles.

Providing oblique RFID printer antenna segments that connect axial RFID printer antenna segments is not merely a design choice. In example embodiments where an example RFID printer antenna comprises oblique RFID printer antenna segments connecting axial RFID printer antenna segments, the example RFID printer antenna (as well as the example RFID printer that implements the example RFID printer antenna) can provide various technical improvements and advantages, as well as various technical functions that many RFID printer antennae and RFID printers cannot provide.

For example, each of the oblique RFID printer antenna segments and the axial RFID printer antenna segments can produce an electromagnetic field. Because the oblique RFID printer antenna segments are connected to the axial RFID printer antenna segments, the electromagnetic fields produced by the oblique RFID printer antenna segments and the axial RFID printer antenna segments can be connected, creating alternating electromagnetic fields that propagate RF signals in multiple directions. When an example RFID tag is encoded by an example RFID printer antenna comprising oblique RFID printer antenna segments connecting axial RFID printer antenna segments, radiation induced in the RFID tag antenna is stronger and the efficiency of energy transfer is higher compared to those of RFID printer antennae that do not comprise oblique RFID printer antenna segments connecting axial RFID printer antenna segments. In other words, connecting oblique RFID printer antenna segments and axial RFID printer antenna segments can provide technical contributions in solving technical issues that are plagued by many RFID printers (including, but not limited to, limited compatibility with only certain types of RFID tags, low radiation induced in the RFID tag antenna and low energy transfer efficiency).

As described above, an example RFID printer antenna in accordance with some embodiments of the present disclosure may be embedded as a part of a PCB antenna that can be used in an example RFID printer. Referring now to FIG. 5B and FIG. 5C, an example PCB antenna 523 is illustrated.

In particular, FIG. 5B and FIG. 5C provide example exploded views of the example PCB antenna 523. As shown, the example PCB antenna 523 comprises an example top PCB antenna layer 509 and an example bottom PCB antenna layer 511.

In some embodiments, the example top PCB antenna layer 509 is stacked on top of the example bottom PCB antenna layer 511. For example, the example top PCB antenna layer 509 is attached to the bottom PCB antenna layer 511 through fastening mechanisms such as, but not limited to, chemical glues.

In some embodiments, the example top PCB antenna layer 509 and the example bottom PCB antenna layer 511 comprise different materials. In some embodiments, the example top PCB antenna layer 509 comprises conductive materials such as, but not limited to, copper. In some embodiments, the example bottom PCB antenna layer 511 comprises dielectric materials such as, but not limited to, plastics.

In some embodiments, the RFID printer antenna 500 described above in connection with FIG. 5A can be embedded/formed on the example top PCB antenna layer 509 through one or more patterning processes such as, but not limited to, chemical etching.

For example, the shape and the layout of the RFID printer antenna 500 can be replicated on a protective mask (such as, but not limited to, glossy paper). In this example, the protective mask may be attached to the example top PCB antenna layer 509 of the example PCB antenna 523, covering a portion of the example top PCB antenna layer 509 that has the same shape and layout of the RFID printer antenna 500. Subsequently, the example PCB antenna 523 may be bathed in a copper solvent solution, which can remove exposed copper from the example top PCB antenna layer 509 that is not covered by the protective mask. After the exposed copper is removed, the example PCB antenna 523 may be taken out of the copper solvent solution, and the protective mask may be removed from the example top PCB antenna layer 509. The remaining copper on the example top PCB antenna layer 509 has the same shape and layout as the RFID printer antenna 500. As such, the RFID printer antenna 500 described above in connection with FIG. 5A is embedded/formed on the example top PCB antenna layer 509 of the example PCB antenna 523.

While the description above provides an example of embedding/forming the RFID printer antenna as a part of an example PCB antenna, it is noted that the scope of the present disclosure is not limited to the description above. Additionally, or alternatively, an example RFID printer antenna may be formed or embedded on a PCB through other methods. Additionally, or alternatively, an example RFID printer may comprise an example RFID printer antenna that is not in the form of a PCB antenna.

In some embodiments, the RFID printer antenna 500 on the example top PCB antenna layer 509 of the example PCB antenna 523 receives electric current.

In the example shown in FIG. 5B and FIG. 5C, the example bottom PCB antenna layer 511 of the RFID printer antenna 500 comprises an electric current inlet 513 and an electric current outlet 517. In some embodiments, an inlet end 525 of the RFID printer antenna 500 on the example top PCB antenna layer 509 is connected to the electric current inlet 513 on the example bottom PCB antenna layer 511, and an outlet end 527 of the RFID printer antenna 500 on the example top PCB antenna layer 509 is connected to the electric current outlet 517 on the example bottom PCB antenna layer 511.

In some embodiments, the electric current flows from the electric current inlet 513 to the electric current outlet 517. In such embodiments, the electric current flows from the inlet end 525 of the RFID printer antenna 500 to the outlet end 527 of the RFID printer antenna 500. FIG. 5B and FIG. 5C illustrate the flow direction 515 of electric current in the RFID printer antenna 500.

In some embodiments, the example RFID printer antenna 500 may produce an electromagnetic field when the electric current passes through the example RFID printer antenna 500. As described above, the magnetic force direction of the electromagnetic field produced by the electric current can be determined by the right-hand screw rule. In particular, the right-hand screw rule associates the flow direction 515 of the electric current in the example RFID printer antenna 500 with the magnetic force direction of the electromagnetic field produced by the electric current. FIG. 5B and FIG. 5C further illustrate example magnetic force directions of the electromagnetic field produced by the electric current flowing through the example RFID printer antenna 500 along the flow direction 515.

In FIG. 5B, the plus signs ("+") are positioned above the example RFID printer antenna 500, and the minus signs ("−") are positioned under the example RFID printer antenna 500. In this example, the plus signs ("+") indicate locations where the magnetic force rotates out of an imaginary plane that is orthogonal to the example RFID printer antenna 500, and the minus signs ("−") indicate locations where the magnetic force rotates into the imaginary plane that is orthogonal to the example RFID printer antenna 500. As such, FIG. 5B illustrates that the magnetic force of the electromagnetic field produced by the electric current flowing through the example RFID printer antenna 500 rotates from above the example RFID printer antenna 500 to below the example RFID printer antenna 500, and propagates along the example RFID printer antenna 500 (for example, along the various axial RFID printer antenna segments and the various oblique RFID printer antenna segments as described above).

In FIG. 5C, the rotational direction 519A illustrates the magnetic force direction of the electromagnetic field produced by the electric current flowing through the oblique RFID printer antenna segment 507C. The rotational direction 519B illustrates the magnetic force direction of the electromagnetic field produced by the electric current flowing through the axial RFID printer antenna segment 501B. The rotational direction 519C illustrates the direction of the magnetic force of the electromagnetic field produced by the electric current flowing through the oblique RFID printer antenna segment 507D. The rotational direction 519D illustrates the direction of the magnetic force of the electromagnetic field produced by the electric current flowing through the axial RFID printer antenna segment 505A.

As described above, the electromagnetic field produced by the example RFID printer antenna 500 propagates RF signals that can be used to embed digital data and/or information. In some embodiments, the propagating direction of the RF signals is determined by the magnetic force direction of the electromagnetic field produced by the example RFID printer antenna 500, which is in turn determined by the shape and the layout of the example RFID printer antenna 500. As such, the shape and the layout of the example RFID printer antenna 500 can provide technical advantages and benefits that improve the propagation of the RF signals.

As described above, each of the plurality of oblique RFID printer antenna segments connects two of the plurality of axial RFID printer antenna segments. In the present disclosure, the term "antenna segment connection angle" refers to an angle between an axial RFID printer antenna segment and an oblique RFID printer antenna segment that are connected to one another. In some embodiments, the antenna segment connection angles of an example RFID printer antenna are oblique angles.

As an example, the plurality of axial RFID printer antenna segments of the example RFID printer antenna 500 shown in FIG. 5B and FIG. 5C comprise a first axial RFID printer antenna segment 503B and a second axial RFID printer antenna segment 501B. In some embodiments, the plurality of oblique RFID printer antenna segments of the example RFID printer antenna 500 shown in FIG. 5B and FIG. 5C comprise a first oblique RFID printer antenna segment 507C. As shown in FIG. 5B and FIG. 5C, the first oblique RFID printer antenna segment 507C connects the first axial RFID printer antenna segment 503B and the second axial RFID printer antenna segment 501B.

In some embodiments, a first antenna segment connection angle 541A between the first axial RFID printer antenna segment 503B and the first oblique RFID printer antenna segment 507C is an oblique angle. In other words, the first antenna segment connection angle 541A is not 0°, 90° or 180°.

In such embodiments, the antenna segment connection angle being an oblique angle (i.e. not 0°, 90°, 180°, etc.) is not merely a design choice. In example embodiments where an example RFID printer antenna comprises oblique RFID printer antenna segments that are connected to axial RFID printer antenna segments at oblique angles, the example RFID printer antenna (as well as the example RFID printer that implements the example RFID printer antenna) can provide various technical improvements and advantages, as well as various technical functions that many RFID printer antennae and RFID printers cannot provide. For example, when the antenna segment connection angles between the axial RFID printer antenna segments and the oblique RFID printer antenna segments are oblique angles, the electromagnetic field produced by the axial RFID printer antenna segments and the electromagnetic field produced by the oblique RFID printer antenna segments are alternating at oblique angles. As illustrated above in connection with at least FIG. 4, an example RFID tag antenna may comprise antenna segments that are at oblique angles with one another. When such an example RFID tag is encoded by an example RFID printer antenna comprising oblique RFID printer antenna segments that are connected to axial RFID printer antenna segments at oblique angles, the radiation induced in the RFID tag antenna is stronger and the efficiency of energy transfer is higher compared to those of RFID printer antennae that do not comprise oblique RFID printer antenna segments that are connected to axial RFID printer antenna segments at oblique angles. In other words, an RFID printer antenna comprising oblique RFID printer antenna segments that are connected to axial RFID printer antenna segments at oblique angles can provide technical contributions in solving technical issues that are plagued by many RFID printers (including, but not limited to, limited compatibility with only certain types of RFID tags, low radiation induced in the RFID tag antenna and low energy transfer efficiency).

In some embodiments, the first antenna segment connection angle 541A is between 90° (exclusive) and 180° (exclusive).

In such embodiments, the antenna segment connection angle being between 90° (exclusive) and 180° (exclusive) is not merely a design choice. In example embodiments where an example RFID printer antenna has antenna segment connection angles being between 90° (exclusive) and 180° (exclusive), the example RFID printer antenna (as well as the example RFID printer that implements the example RFID printer antenna) can provide various technical improvements and advantages, as well as various technical functions that many RFID printer antennae and RFID printers cannot provide. For example, when the antenna segment connection angles between the axial RFID printer antenna segments and the oblique RFID printer antenna segments are between 90° (exclusive) and 180° (exclusive), the electromagnetic fields produced by the axial RFID printer antenna segments and the electromagnetic fields produced by the oblique RFID printer antenna segments are arranged between 90° (exclusive) and 180° (exclusive). As illustrated above in connection with at least FIG. 4, an example RFID tag antenna may comprise antenna segments that are positioned at angles between 90° (exclusive) and 180° (exclusive) with one another. When such an example RFID tag is encoded by an example RFID printer antenna comprising antenna segment connection angles being between 90° (exclusive) and 180° (exclusive), the radiation induced in the RFID tag antenna is stronger and the efficiency of energy transfer is higher compared to those of RFID printer antennae that do not comprise antenna segment connection angles being between 90° (exclusive) and 180° (exclusive). In other words, an RFID printer antenna comprising oblique RFID printer antenna segments that are connected to axial RFID printer antenna segments between 90° (exclusive) and 180° (exclusive) can provide technical contributions in solving technical issues that are plagued by many RFID printers (including, but not limited to, limited compatibility with only certain types of RFID tags, low radiation induced in the RFID tag antenna and low energy transfer efficiency).

In some embodiments, the first antenna segment connection angle 541A is 135°.

In such embodiments, the antenna segment connection angle being 135° is not merely a design choice. In example embodiments where an example RFID printer antenna has antenna segment connection angles being 135°, the example RFID printer antenna (as well as the example RFID printer that implements the example RFID printer antenna) can provide various technical improvements and advantages, as well as various technical functions that many RFID printer antennae and RFID printers cannot provide. For example, when the antenna segment connection angles between an axial RFID printer antenna segment and the oblique RFID printer antenna segment is 135°, the electromagnetic field produced by the axial RFID printer antenna segment and the electromagnetic field produced by the oblique RFID printer antenna segment are positioned relatively to one another at 135°. As illustrated above in connection with at least FIG. 4, an example RFID tag antenna may comprise antenna segments that are positioned at an angle of 135°. When such an example RFID tag is encoded by an example RFID printer antenna comprising oblique RFID printer antenna segments that are connected to axial RFID printer antenna segments at 135°, the radiation induced in the RFID tag antenna is stronger and the efficiency of energy transfer is higher compared to those of RFID printer antennae that do not comprise oblique RFID printer antenna segments that are connected to axial RFID printer antenna segments at 135°. In other words, an RFID printer antenna comprising oblique RFID printer antenna segments that are connected to axial RFID printer antenna segments at 135° can provide technical contributions in solving technical issues that are plagued by many RFID printers (including, but not limited to, limited compatibility with only certain types of RFID tags, low radiation induced in the RFID tag antenna and low energy transfer efficiency).

While the description above provides examples of antenna segment connection angles, it is noted that the scope of the present disclosure is not limited to the description above.

In some embodiments, an example RFID printer antenna may comprise oblique RFID printer antenna segment(s) connected to axial RFID printer antenna segment(s) at an example antenna segment connection angle between 0° (exclusive) and 90° (exclusive) in addition to or in alternative of the examples illustrated above.

In such embodiments, the antenna segment connection angle being between 0° (exclusive) and 90° (exclusive) is not merely a design choice. In example embodiments where an example RFID printer antenna has antenna segment connection angles being between 0° (exclusive) and 90° (exclusive), the example RFID printer antenna (as well as the example RFID printer that implements the example RFID printer antenna) can provide various technical improvements and advantages, as well as various technical functions that many RFID printer antennae and RFID printers cannot provide. For example, when an antenna segment connection angle between the axial RFID printer antenna segment and the oblique RFID printer antenna segment is between 0° (exclusive) and 90° (exclusive), the electromagnetic field produced by the axial RFID printer antenna segment and the electromagnetic field produced by the oblique RFID printer antenna segment are arranged between 0° (exclusive) and 90° (exclusive). As illustrated above in connection with at least FIG. 4, an example RFID tag antenna may comprise antenna segments that are positioned at angles between 0° (exclusive) and 90° (exclusive) with one another. When such an example RFID tag is encoded by an example RFID printer antenna comprising antenna segment connection angles being between 0° (exclusive) and 90° (exclusive), the radiation induced in the RFID tag antenna is stronger and the efficiency of energy transfer is higher compared to those of RFID printer antennae that do not comprise antenna segment connection angles being between 0° (exclusive) and 90° (exclusive). In other words, an RFID printer antenna comprising oblique RFID printer antenna segments that are connected to axial RFID printer antenna segments at antenna segment connection angles being between 0° (exclusive) and 90° (exclusive) can provide technical contributions in solving technical issues that are plagued by many RFID printers (including, but not limited to, limited compatibility with only certain types of RFID tags, low radiation induced in the RFID tag antenna and low energy transfer efficiency).

In some embodiments, an example RFID printer antenna may comprise oblique RFID printer antenna segment(s) connected to axial RFID printer antenna segment(s) at an example antenna segment connection angle of 45° in addition to or in alternative of the examples illustrated above.

In such embodiments, the antenna segment connection angle being 45° is not merely a design choice. In example embodiments where an example RFID printer antenna has antenna segment connection angles at 45°, the example RFID printer antenna (as well as the example RFID printer that implements the example RFID printer antenna) can provide various technical improvements and advantages, as well as various technical functions that many RFID printer antennae and RFID printers cannot provide. For example, when the antenna segment connection angles between the axial RFID printer antenna segments and the oblique RFID printer antenna segments are 45°, the electromagnetic field produced by the axial RFID printer antenna segment and the electromagnetic field produced by the oblique RFID printer antenna segment are positioned relatively to one another at 45°. As illustrated above in connection with at least FIG. 4, an example RFID tag antenna may comprise antenna segments that are positioned at an angle of 45°. When such an example RFID tag is encoded by an example RFID printer antenna comprising oblique RFID printer antenna segments that are connected to axial RFID printer antenna segments at 45°, the radiation induced in the RFID tag antenna is stronger and the efficiency of energy transfer is higher compared to those of RFID printer antennae that do not comprise oblique RFID printer antenna segments that are connected to axial RFID printer antenna segments at 45°. In other words, an RFID printer antenna comprising oblique RFID printer antenna segments that are connected to axial RFID printer antenna segments at 45° can provide technical contributions in solving technical issues that are plagued by many RFID printers (including, but not limited to, limited compatibility with only certain types of RFID tags, low radiation induced in the RFID tag antenna and low energy transfer efficiency).

As described above, the example RFID printer antenna 500 may receive an electric current, and the RFID printer antenna segments that is the first/initial segment to receive the electric current is referred to as the current input antenna segment. In the present disclosure, the term "input antenna segment angle" refers to an angle between the input antenna segment angle and another antenna segment of the RFID printer antenna (such as another axial RFID printer antenna segment or another oblique RFID printer antenna segment). In some embodiments, an example RFID printer antenna comprises a plurality of varying input antenna segment angle to obtain maximum coverage of RF signals.

For example, as shown in FIG. 5B and FIG. 5C, the axial RFID printer antenna segment 503A is the current input antenna segment. The example RFID printer antenna 500 also comprises antenna segments that are at different input antenna segment angles relative to the current input antenna segment. For example, the axial RFID printer antenna segment 503B is aligned with the current input antenna segment at a 0 degree angle. The axial RFID printer antenna segment 501B and the axial RFID printer antenna segment 505A are parallel to the current input antenna segment. The oblique RFID printer antenna segment 507C is at an angle of 135 degrees relative to the current input antenna segment. The oblique RFID printer antenna segment 507D is at an angle of degrees relative to the current input antenna segment.

In such embodiments, having input antenna segment angles being at varying degrees is not merely a design choice. In example embodiments where an example RFID printer antenna comprise RFID printer antenna segments associated with varying, different input antenna segment angles, the example RFID printer antenna (as well as the example RFID printer that implements the example RFID printer antenna) can provide various technical improvements and advantages, as well as various technical functions that many RFID printer antennae and RFID printers cannot provide. For example, because different RFID tags can comprise RFID tag antenna segments that are arranged at different angles, an example RFID printer antenna with varying, different input antenna segment angles can provide technical advantages and benefits such as, but not limited to, providing uniform electric current distribution across space, which in turn creates uniform electromagnetic field distribution and better RF signal coverage, improving power induction for and compatibility with different types of RFID tags.

In some embodiments, an example RFID printer antenna may comprise a plurality of antenna segments that are associated with different input antenna segment angles between a range of 45 degrees to 135 degrees.

In such embodiments, providing different input antenna segment angles between a range of 45 degrees to 135 degrees for the example RFID printer antenna is not merely a design choice. In example embodiments where an example RFID printer antenna comprises antenna segments that are associated with different input antenna segment angles between a range of 45 degrees to 135 degrees, the example RFID printer antenna (as well as the example RFID printer that implements the example RFID printer antenna) can provide various technical improvements and advantages, as well as various technical functions that many RFID printer antennae and RFID printers cannot provide. For example, many RFID tags comprise RFID tag antenna segments that are positioned at angles varying between a range of 45 degrees to 135 degrees. An example RFID printer antenna comprises antenna segments associated with different input antenna segment angles between a range of 45 degrees to 135 degrees can provide technical benefits and advantages such as, but not limited to, maximizing coverage of RF signals detected by the RFID tag and improving power induction for and compatibility with different types of RFID tags.

As described above, the shape and the layout of the example RFID printer antenna 500 can provide technical advantages and benefits. In some embodiments, the shape and the layout of the example RFID printer antenna 500 include not only angles between antenna segments, but also antenna segment lengths of antenna segments and antenna segment distances between antenna segments, which can improve the propagation of the RF signals.

In some embodiments, the oblique RFID printer antenna segment lengths associated with the oblique RFID printer antenna segments are not all the same. In other words, the plurality of oblique RFID printer antenna segments of the example RFID printer antenna 500 are associated with a plurality of oblique RFID printer antenna segment lengths.

As an example, the plurality of axial RFID printer antenna segments comprises a third axial RFID printer antenna segment 505A, in addition to the first axial RFID printer antenna segment 503B and the second axial RFID printer antenna segment 501B described above. In some embodiments, the plurality of oblique RFID printer antenna segments comprises a second oblique RFID printer antenna segment 507D, in addition to the first oblique RFID printer antenna segment 507C described above.

In the example shown in FIG. 5B and FIG. 5C, the first oblique RFID printer antenna segment 507C connects the first axial RFID printer antenna segment 503B and the second axial RFID printer antenna segment 501B, and the second oblique RFID printer antenna segment 507D connects the second axial RFID printer antenna segment 501B and the third axial RFID printer antenna segment 505A.

In some embodiments, the first oblique RFID printer antenna segment length associated with the first oblique RFID printer antenna segment 507C is different from the second oblique RFID printer antenna segment length associated with the second oblique RFID printer antenna segment 507D. As shown in FIG. 5B and FIG. 5C, the first axial RFID printer antenna segment 503B is a center axial RFID printer antenna segment. The second axial RFID printer antenna segment 501B is an upper axial RFID printer antenna segment that is positioned at the upper side of the first axial RFID printer antenna segment 503B. The third axial RFID printer antenna segment 505A is a lower axial RFID printer antenna segment that is positioned at the lower side of the first axial RFID printer antenna segment 503B. As such, the first oblique RFID printer antenna segment length associated with the first oblique RFID printer antenna segment 507C is shorter than the second oblique RFID printer antenna segment length associated with the second oblique RFID printer antenna segment 507D.

Having different oblique RFID printer antenna segment lengths associated with different oblique RFID printer antenna segments is not merely a design choice. In example embodiments where an example RFID printer antenna is associated with different oblique RFID printer antenna segment lengths, the example RFID printer antenna (as well as the example RFID printer that implements the example RFID printer antenna) can provide various technical improvements and advantages, as well as various technical functions that many RFID printer antennae and RFID printers cannot provide.

As described above, each oblique RFID printer antenna segment is connected to two axial RFID printer antenna segments that are in a parallel arrangement with one another. When different oblique RFID printer antenna segments have different oblique RFID printer antenna segment lengths, the axial RFID printer antenna segments are disturbed at different locations along the width of the RFID printer antenna. As a result, the electromagnetic fields generated by the axial RFID printer antenna segments can be distributed along the width of the RFID printer antenna, which in turn expands the propagation range of the RF signals. When an example RFID tag is encoded by an example RFID printer antenna associated with different oblique RFID printer antenna segment lengths, the radiation induced in the RFID tag antenna is stronger and the efficiency of energy transfer is higher compared to those of RFID printer antennae that do not comprise oblique RFID printer antenna segments associated with different oblique RFID printer antenna segment lengths. In other words, having different oblique RFID printer antenna segment lengths provides technical contributions in solving technical issues that are plagued by many RFID printers (including, but not limited to, limited compatibility with only certain types of RFID tags, low radiation induced in the RFID tag antenna and low energy transfer efficiency).

In some embodiments, the distances between neighboring oblique RFID printer antenna segments are different. In other words, the plurality of oblique RFID printer antenna segments of the example RFID printer antenna 500 are distributed unevenly along the length of the RFID printer antenna.

In the present disclosure, the term "neighboring oblique RFID printer antenna segments" refers to two oblique RFID printer antenna segments that are connected to the same axial oblique RFID printer antenna segment. As described above, the neighboring oblique RFID printer antenna segments are in parallel arrangements with one another. In such embodiments, the distance between neighboring oblique RFID printer antenna segments refer to the shortest distance (i.e., the perpendicular distance) between neighboring oblique RFID printer antenna segments.

In the example shown in FIG. 5A, the oblique RFID printer antenna segment 507A and the oblique RFID printer antenna segment 507B are neighboring oblique RFID printer antenna segments, and the oblique RFID printer antenna segment 507B and the oblique RFID printer antenna segment 507C are neighboring oblique RFID printer antenna segments. In some embodiments, the distance between the oblique RFID printer antenna segment 507A and the oblique RFID printer antenna segment 507B is different from the distance between the oblique RFID printer antenna segment 507B and the oblique RFID printer antenna segment 507C.

In such embodiments, having different distances between different neighboring oblique RFID printer antenna segments is not merely a design choice. In example embodiments where an example RFID printer antenna provides different distances between different neighboring oblique RFID printer antenna segments, the example RFID printer antenna (as well as the example RFID printer that implements the example RFID printer antenna) can provide various technical improvements and advantages, as well as various technical functions that many RFID printer antennae and RFID printers cannot provide.

For example, each oblique RFID printer antenna segment generates a corresponding electromagnetic field. When distances between different neighboring oblique RFID printer antenna segments vary, the electromagnetic fields produced by such oblique RFID printer antenna segments become alternating in nature (instead of fixed in nature), increasing the propagation range of the RF signals. When an example RFID tag is encoded by an example RFID printer antenna associated with different distances between different neighboring oblique RFID printer antenna segments, the radiation induced in the RFID tag antenna is stronger and the efficiency of energy transfer is higher compared to those of RFID printer antennae that do not comprise different distances between different neighboring oblique RFID printer antenna segments. In other words, having different distances between different neighboring oblique RFID printer antenna segments provides technical contributions in solving technical issues that are plagued by many RFID printers (including, but not limited to, limited compatibility with only certain types of RFID tags, low radiation induced in the RFID tag antenna and low energy transfer efficiency).

Figure 5D:
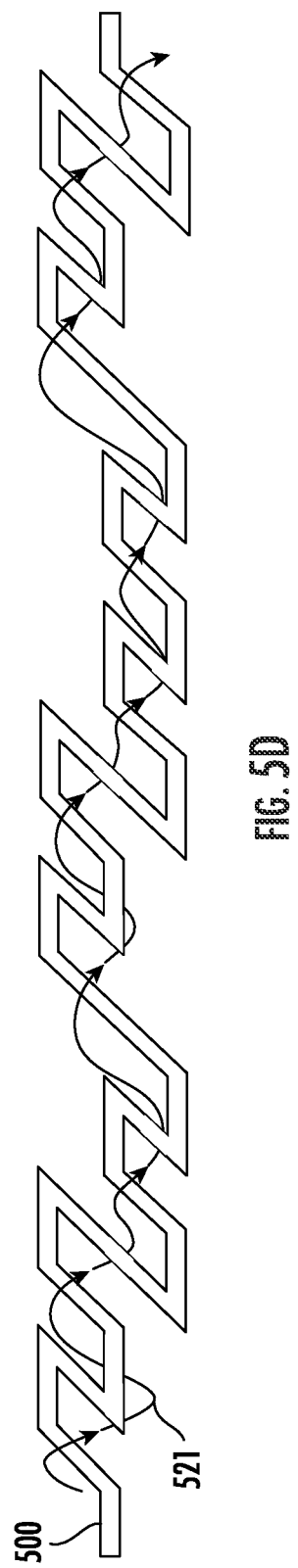
FIG. 5D illustrates the example RFID printer antenna shown in FIG. 5A and example magnetic force directions of example electromagnetic fields produced by the example RFID printer antenna shown in FIG. 5A in accordance with some embodiments of the present disclosure.

As illustrated in the examples above, the shape and the layout of the example RFID printer antenna 500 (including, but not limited to, the varying antenna segment connection angles, the varying input antenna segment angles, the varying oblique RFID printer antenna segment lengths, and the varying distances between neighboring oblique RFID printer antenna segments) can provide technical benefits and advantages. Referring now to FIG. 5D, example magnetic force directions 521 of example electromagnetic fields produced by the example RFID printer antenna 500 shown in FIG. 5A, FIG. 5B, and FIG. 5C are illustrated.

In particular, the example magnetic force directions 521 shown in FIG. 5D are directions of continuous magnetic force connecting electromagnetic fields generated by different antenna segments that are connected to one another (e.g. oblique RFID printer antenna segments connecting axial RFID printer antenna segments described above). As shown in FIG. 5D, the shape and the layout of the example RFID printer antenna 500 enable the example magnetic forces to provide uniform electromagnetic field distributions and better RF signal coverages. When an example RFID tag is encoded by an example RFID printer antenna based on the shape and the layout as shown in FIG. 5A to FIG. 5D, the radiation induced in the RFID tag antenna is stronger and the efficiency of energy transfer is higher compared to those of RFID printer antennae that are not based on the shape and the layout as shown in FIG. 5A to FIG. 5D. In other words, the shape and the layout of the RFID printer antenna 500 provide technical contributions in solving technical issues that are plagued by many RFID printers (including, but not limited to, limited compatibility with only certain types of RFID tags, low radiation induced in the RFID tag antenna and low energy transfer efficiency).

Figure 6:
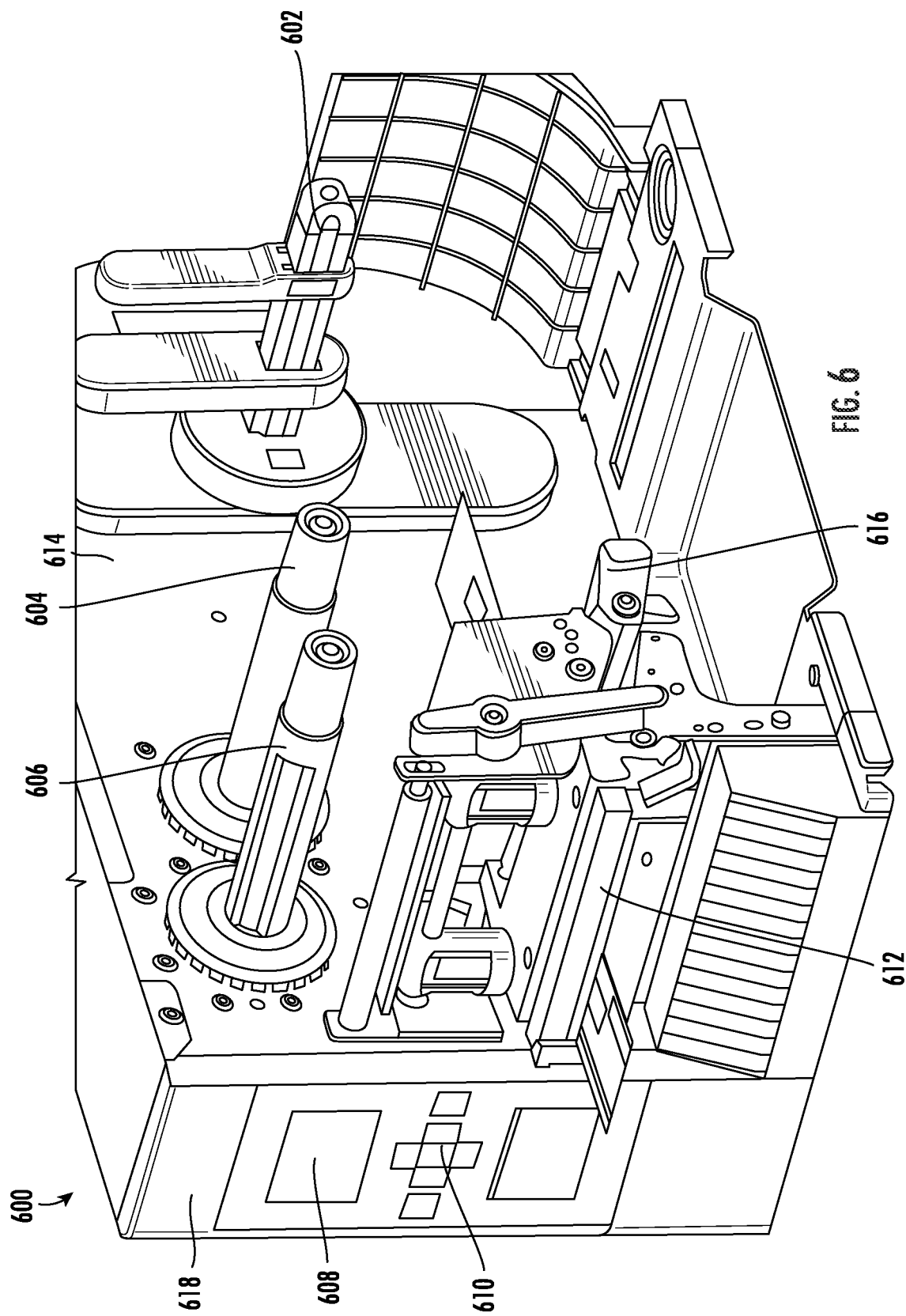
FIG. 6 illustrates an example view of at least a portion of an example RFID printer in accordance with various embodiments of the present disclosure.

Referring now to FIG. 6, an example view of at least a portion of an example RFID printer 600 in accordance with various embodiments of the present disclosure is illustrated.

In the example shown in FIG. 6, the RFID printer 600 comprises a body 614 for enclosing an interior thereof. The RFID printer 600 further comprises a power source and a moveable cover for accessing the interior and any components therein.

In some embodiments, an example RFID media supply roll can be wound on the RFID media supply spindle 602, which is secured to the body 614. In some embodiments, the example RFID media supply roll comprises blank RFID tags that can be encoded by the RFID printer 600.

In some embodiments, the blank RFID tags from the example RFID media supply roll may travel within the body 614 of the RFID printer 600. For example, a travel guide component 616 is secured to the body 614 of the RFID printer 600, guiding the travel direction of the example RFID media supply roll from the RFID media supply spindle 602.

In some embodiments, the blank RFID tags travel to the example RFID printer antenna 612. For example, the travel guide component 616 may guide the blank RFID tags so that they are positioned above the example RFID printer antenna 612. In some embodiments, the example RFID printer antenna 612 may encode digital data and/or information to the blank RFID tag. For example, the example RFID printer antenna 612 may comprise the example PCB antenna 523 described above in connection with FIG. 5A to FIG. 5D and/or may comprise the example RFID printer antenna 500 described above in connection with FIG. 5A to FIG. 5D.

In some embodiments, a ribbon supply roll may be disposed on the ribbon supply spindle 604. The ribbon supply roll may comprise an ink ribbon that supplies ink for printing on the blank RFID tags. In some embodiments, the ribbon supply roll in unwound from the ribbon supply spindle 604 and winded on the ribbon rewind spindle 606.

In some embodiments, the RFID printer 600 may include a graphical user interface (GUI) 618 on the body 614 for communication between a user and the RFID printer 600. The GUI 618 may be communicatively coupled to the other components of the RFID printer 600 for displaying visual and/or auditory information and receiving information from the user (e.g., typed, touched, spoken, etc.). As depicted in FIG. 6, the GUI 618 may comprise a display 608 and keys 610 that may be configured to perform various functions.

Referring now to FIG. 7, FIG. 8, FIG. 9, FIG. 10, FIG. 11, FIG. 12, FIG. 13 and FIG. 14, example diagrams illustrating example testing results of encoding example RFID tags (for example, writing data to example RFID tags) and decoding example RFID tags (for example, reading data from example RFID tags) by RFID printers are provided. In the example testing results, the larger the overlapping area (i.e. the area within dashed-border rectangle in the example testing results), the larger the area of the RFID tag antenna that can receive the RF signals from the RFID printer antenna, and the more compatible the RFID printer antenna is in encoding and deciding different types of RFID tags.

FIG. 7, FIG. 9, FIG. 11, and FIG. 13 illustrate example testing results of encoding example RFID tags (for example, writing data to example RFID tags) and decoding example RFID tags (for example, reading data from example RFID tags) by an example RFID printer that comprises an example RFID printer antenna in accordance with some embodiments of the present disclosure (such as the example RFID printer antenna 500 illustrated in connection with FIG. 5A to FIG. 5D). In contrast, FIG. 8, FIG. 10, FIG. 12, and FIG. 14 illustrate example testing results of encoding example RFID tags (for example, writing data to example RFID tags) and decoding example RFID tags (for example, reading data from example RFID tags) by an example RFID printer with an RFID printer antenna that does not incorporate embodiments of the present disclosure (such as the example RFID printer antenna 101 illustrated in connection with FIG. 1).

Referring now to FIG. 7 and FIG. 8, the example results of encoding and decoding a first type of ultra-high frequency (UHF) RFID tag are illustrated. FIG. 7 illustrates example results 700 of encoding and decoding the RFID tag by an example RFID printer that comprises an example RFID printer antenna in accordance with some embodiments of the present disclosure (such as the example RFID printer antenna 500 illustrated in connection with FIG. 5A to FIG. 5D). FIG. 8 illustrates example results 800 of encoding and decoding the RFID tag by an example RFID printer with an RFID printer antenna that does not incorporate embodiments of the present disclosure (such as the example RFID printer antenna 101 illustrated in connection with FIG. 1).

As shown, the area 701 in the example results 700 is larger than the area 802 in the example results 800, indicating that the shape and the layout of the example RFID printer antenna in accordance with some embodiments of the present disclosure (such as the example RFID printer antenna 500 illustrated in connection with FIG. 5A to FIG. 5D) can provide improved performance in encoding and decoding the first type of UHF RFID tag.

Figure 9:
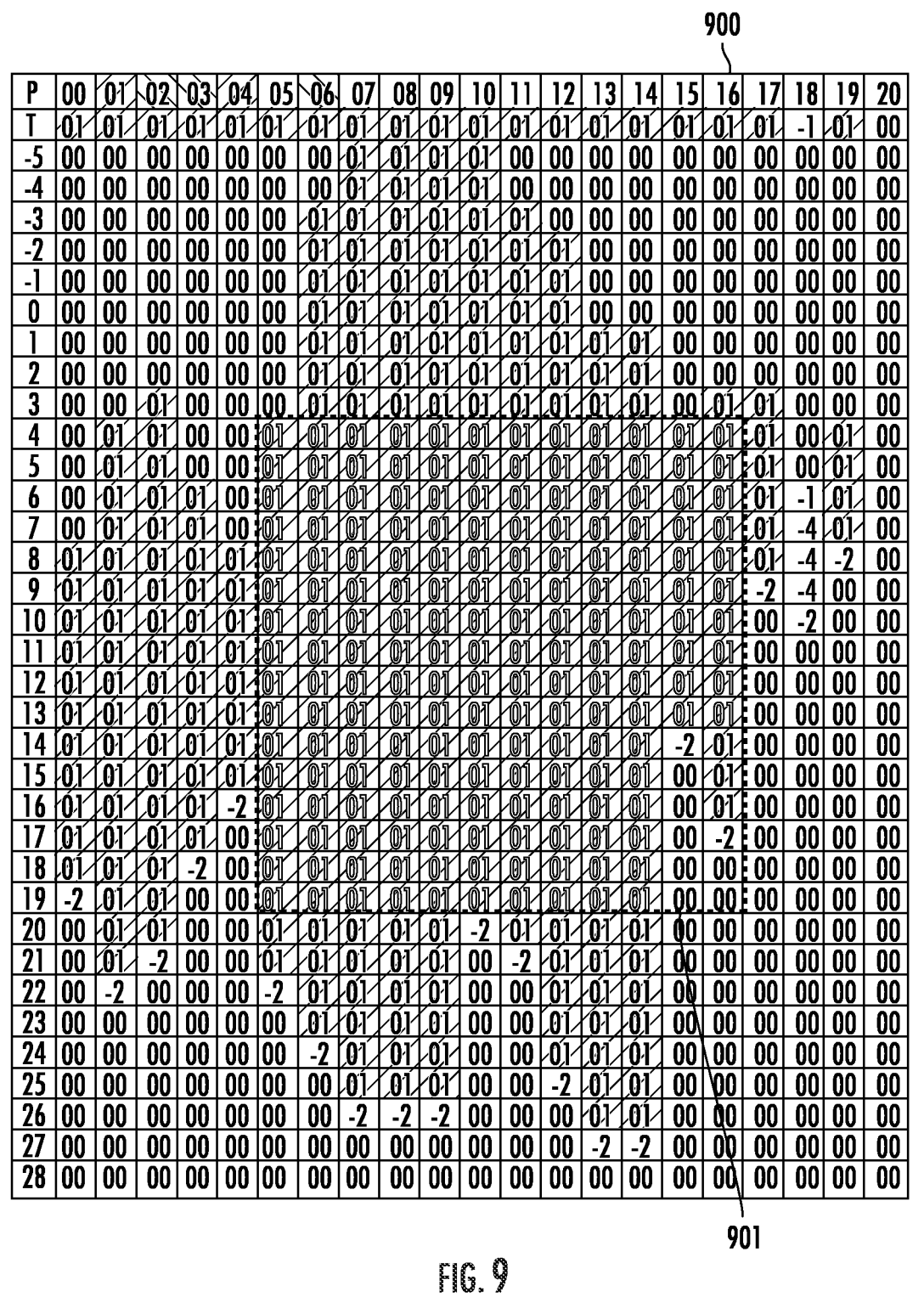

Referring now to FIG. 9 and FIG. 10, the example results of encoding and decoding a second type of UHF RFID tag are illustrated. FIG. 9 illustrates example results 900 of encoding and decoding the RFID tag by an example RFID printer that comprises an example RFID printer antenna in accordance with some embodiments of the present disclosure (such as the example RFID printer antenna 500 illustrated in connection with FIG. 5A to FIG. 5D). FIG. 10 illustrates example results 1000 of encoding and decoding the RFID tag by an example RFID printer with an RFID printer antenna that does not incorporate embodiments of the present disclosure (such as the example RFID printer antenna 101 illustrated in connection with FIG. 1).

As shown, the area 901 in the example results 900 is larger than the combination of the area 1002 and the area 1004 in the example results 1000, indicating that shape and the layout of the example RFID printer antenna in accordance with some embodiments of the present disclosure (such as the example RFID printer antenna 500 illustrated in connection with FIG. 5A to FIG. 5D) can provide improved performance in encoding and decoding the second type of UHF RFID tag.

Figure 11:
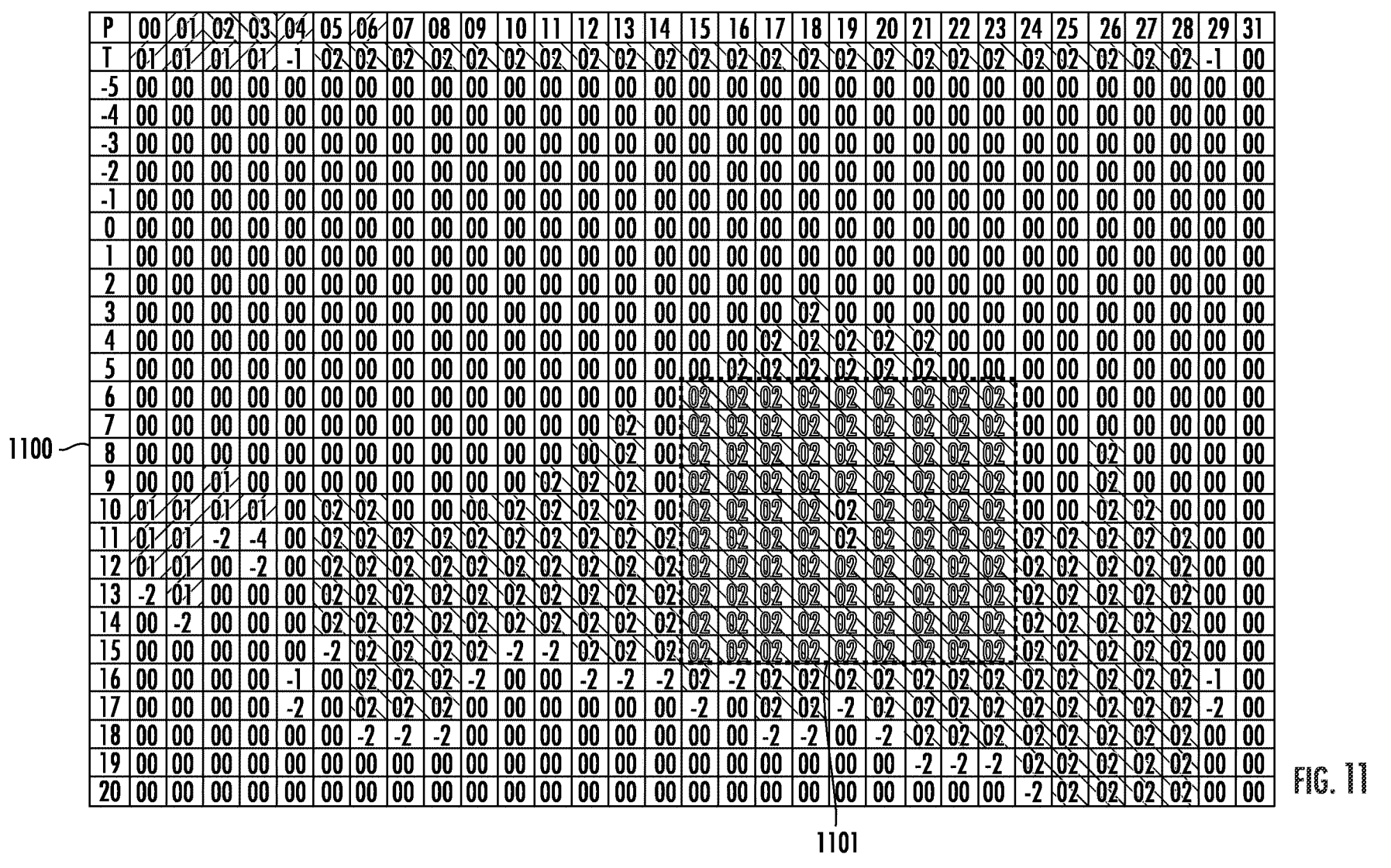
Figure 12:
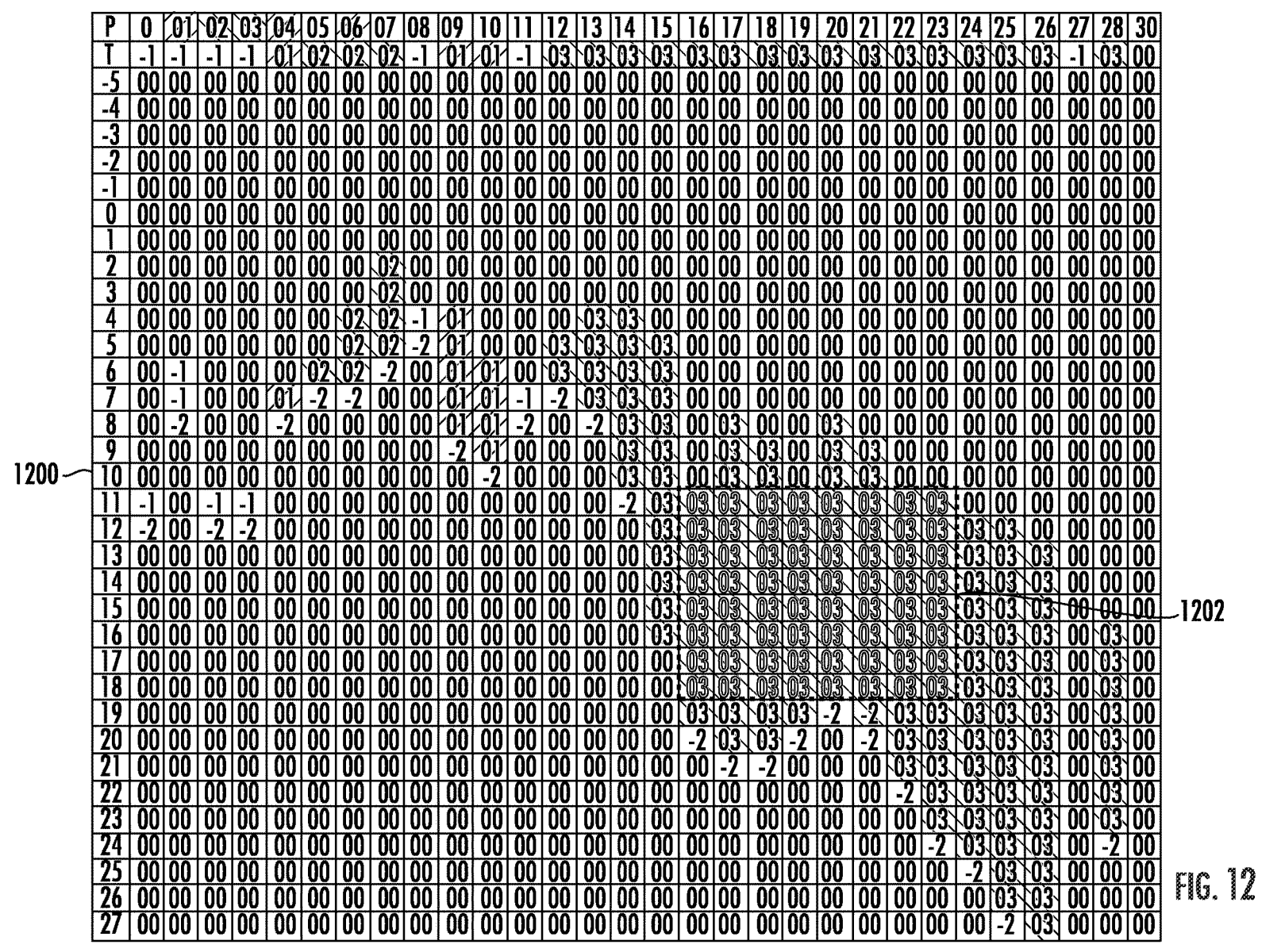

Referring now to FIG. 11 and FIG. 12, the example results of encoding and decoding a third type of UHF RFID tag are illustrated. FIG. 11 illustrates example results 1100 of encoding and decoding the RFID tag by an example RFID printer that comprises an example RFID printer antenna in accordance with some embodiments of the present disclosure (such as the example RFID printer antenna 500 illustrated in connection with FIG. 5A to FIG. 5D). FIG. 12 illustrates example results 1200 of encoding and decoding the RFID tag by an example RFID printer with an RFID printer antenna that does not incorporate embodiments of the present disclosure (such as the example RFID printer antenna 101 illustrated in connection with FIG. 1).

As shown, the area 1101 in the example results 1100 is larger than the area 1202 in the example results 1200, indicating that shape and the layout of the example RFID printer antenna in accordance with some embodiments of the present disclosure (such as the example RFID printer antenna 500 illustrated in connection with FIG. 5A to FIG. 5D) can provide improved performance in encoding and decoding the third type of UHF RFID tag.

Figure 14:
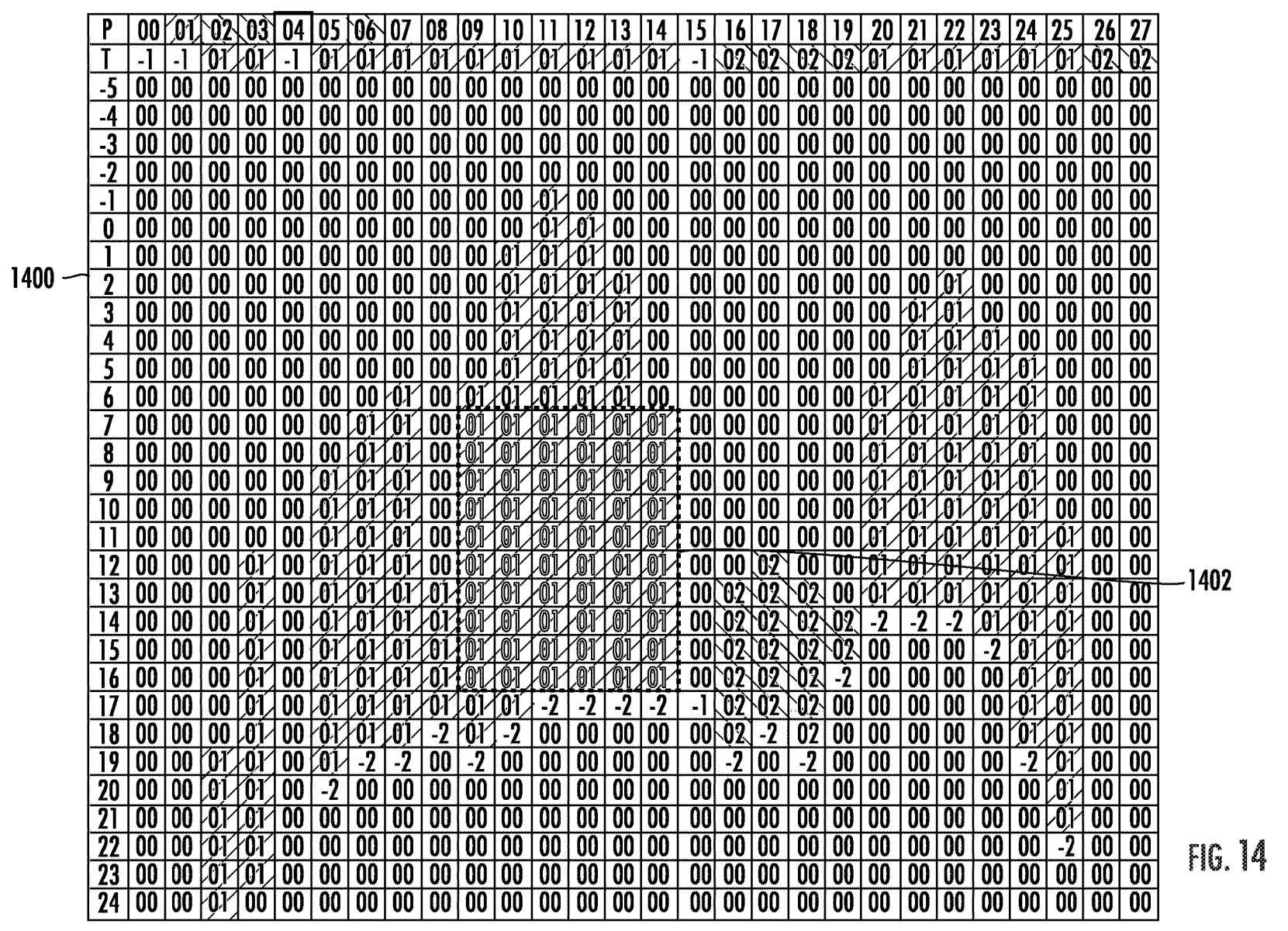

Referring now to FIG. 13 and FIG. 14, the example results of encoding and decoding a fourth type of UHF RFID tag are illustrated. FIG. 13 illustrates example results 1300 of encoding and decoding the RFID tag by an example RFID printer that comprises an example RFID printer antenna in accordance with some embodiments of the present disclosure (such as the example RFID printer antenna 500 illustrated in connection with FIG. 5A to FIG. 5D). FIG. 14 illustrates example results 1400 of encoding and decoding the RFID tag by an example RFID printer with an RFID printer antenna that does not incorporate embodiments of the present disclosure (such as the example RFID printer antenna 101 illustrated in connection with FIG. 1).

As shown, the area 1301 in the example results 1300 is larger than the area 1402 in the example results 1400, indicating that shape and the layout of the example RFID printer antenna in accordance with some embodiments of the present disclosure (such as the example RFID printer antenna 500 illustrated in connection with FIG. 5A to FIG. 5D) can provide improved performance in encoding and decoding the fourth type of UHF RFID tag.

The example testing results shown in FIG. 7 to FIG. 14 demonstrate the technical benefits and advantages of an example RFID printer antenna in accordance with some embodiments of the present disclosure (such as the example RFID printer antenna 500 illustrated in connection with FIG. 5A to FIG. 5D). In particular, the shape and layout of the as the example RFID printer antenna 500 illustrated in connection with FIG. 5A to FIG. 5D can provide improved performance and compatibility in detecting, reading, and writing more types of RFID tags (including, but not limited to, UHF RFID tags). For example, the snake-type shape of the example RFID printer antenna 500 illustrated in connection with FIG. 5A to FIG. 5D can provide alternating magnetic fields, which can solve technical issues such as low radiation induced in the RFID tag antenna and low energy transfer efficiency that are plagued by many RFID printer antennae due to their fixed magnetic fields.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

The invention claimed is:

1. A radio-frequency identification (RFID) antenna for an RFID printer comprising:
 a plurality of axial RFID antenna segments that are in parallel arrangements with one another; and
 a plurality of oblique RFID antenna segments that are parallel with one another, wherein each of the plurality of oblique RFID antenna segments is connected to two of the plurality of axial RFID antenna segments at oblique angles, wherein a first angle between a first axial RFID antenna segment and a first oblique RFID antenna segment is in a range between 90° and 180° and a second angle between a second axial RFID antenna segment and the first oblique RFID antenna segment is in a range between 0° and 90°.

2. The RFID antenna of claim 1, wherein the plurality of axial RFID antenna segments comprises:
 a plurality of central RFID antenna segments that are coaxial with one another;
 a plurality of upper RFID antenna segments that are coaxial with one another and positioned on an upper side of the plurality of central RFID antenna segments; and
 a plurality of lower RFID antenna segments that are coaxial with one another and positioned on a lower side of the plurality of central RFID antenna segments.

3. The RFID antenna of claim 2, wherein the plurality of central RFID antenna segments comprises a first central axial RFID antenna segment and a second central axial RFID antenna segment, wherein the plurality of upper RFID antenna segments comprises a first upper RFID antenna segment.

4. The RFID antenna of claim 3, wherein the plurality of oblique RFID antenna segments comprises the first oblique RFID antenna segment connecting the first central axial RFID antenna segment and the first upper RFID antenna segment.

5. The RFID antenna of claim 4, wherein the first angle between the first central axial RFID antenna segment and the first oblique RFID antenna segment is not 90° or 180°.

6. The RFID antenna of claim 5, wherein the first angle between the first central axial RFID antenna segment and the first oblique RFID antenna segment is 135°.

7. The RFID antenna of claim 4, wherein the plurality of central RFID antenna segments comprises a second upper RFID antenna segment and a first lower axial RFID antenna segment,
wherein the plurality of oblique RFID antenna segments comprises a third oblique RFID antenna segment connecting the second central axial RFID antenna segment and the second upper RFID antenna segment, wherein the first angle between the second central axial RFID antenna segment and the third oblique RFID antenna segment is 135°; and
wherein the plurality of oblique RFID antenna segments comprises a fourth oblique RFID antenna segment connecting the second upper RFID antenna segment and the first lower axial RFID antenna segment, wherein the second angle between the second upper RFID antenna segment and the fourth oblique RFID antenna segment is 45°.

8. The RFID antenna of claim 3, wherein the plurality of oblique RFID antenna segments comprises a second oblique RFID antenna segment connecting the first upper RFID antenna segment and the second central axial RFID antenna segment.

9. The RFID antenna of claim 8, wherein the second angle between the first upper RFID antenna segment and the second oblique RFID antenna segment is not 0° or 90°.

10. The RFID antenna of claim 9, wherein the second angle between the first upper RFID antenna segment and the second oblique RFID antenna segment is 45°.

11. A radio-frequency identification (RFID) printer comprising:
an antenna bottom board; and
an RFID antenna disposed on top of the antenna bottom board, wherein the RFID antenna comprises a plurality of axial RFID antenna segments and a plurality of oblique RFID antenna segments, wherein the plurality of axial RFID antenna segments are in parallel arrangements with one another, wherein each of the plurality of oblique RFID antenna segments is connected to two of the plurality of axial RFID antenna segments at oblique angles, wherein the plurality of oblique RFID antenna segments are in parallel with one another, and wherein a first angle between a first axial RFID antenna segment and a first oblique RFID antenna segment is in a range between 90° and 180° and a second angle between a second axial RFID antenna segment and the first oblique RFID antenna segment is in a range between 0° and 90°.

12. The RFID printer of claim 11, wherein the plurality of axial RFID antenna segments comprises:
a plurality of central RFID antenna segments that are coaxial with one another;
a plurality of upper RFID antenna segments that are coaxial with one another and positioned on an upper side of the plurality of central RFID antenna segments; and
a plurality of lower RFID antenna segments that are coaxial with one another and positioned on a lower side of the plurality of central RFID antenna segments.

13. The RFID printer of claim 12, wherein the plurality of central RFID antenna segments comprises a first central axial RFID antenna segment and a second central axial RFID antenna segment, wherein the plurality of upper RFID antenna segments comprises a first upper RFID antenna segment.

14. The RFID printer of claim 13, wherein the plurality of oblique RFID antenna segments comprises the first oblique RFID antenna segment connecting the first central axial RFID antenna segment and the first upper RFID antenna segment.

15. The RFID printer of claim 14, wherein the first angle between the first central axial RFID antenna segment and the first oblique RFID antenna segment is not 90° or 180°.

16. The RFID printer of claim 15, wherein the first angle between the first central axial RFID antenna segment and the first oblique RFID antenna segment is 135°.

17. The RFID printer of claim 14, wherein the plurality of central RFID antenna segments comprises a second upper RFID antenna segment and a first lower axial RFID antenna segment, wherein the plurality of oblique RFID antenna segments comprises a third oblique RFID antenna segment connecting the second central axial RFID antenna segment and the second upper RFID antenna segment, wherein the first angle between the second central axial RFID antenna segment and the third oblique RFID antenna segment is 135°; and wherein the plurality of oblique RFID antenna segments comprises a fourth oblique RFID antenna segment connecting the second upper RFID antenna segment and the first lower axial RFID antenna segment, wherein the second angle between the second upper RFID antenna segment and the fourth oblique RFID antenna segment is 45°.

18. The RFID printer of claim 13, wherein the plurality of oblique RFID antenna segments comprises a second oblique RFID antenna segment connecting the first upper RFID antenna segment and the second central axial RFID antenna segment.

19. The RFID printer of claim 18, wherein the second angle between the first upper RFID antenna segment and the second oblique RFID antenna segment is not 0°, 90°.

20. The RFID printer of claim 19, wherein the second angle between the first upper RFID antenna segment and the second oblique RFID antenna segment is 45°.

* * * * *